US009547792B2

(12) United States Patent
Terada et al.

(10) Patent No.: US 9,547,792 B2
(45) Date of Patent: Jan. 17, 2017

(54) CONTROL APPARATUS, VEHICLE, AND PORTABLE TERMINAL

(71) Applicant: CLARION CO., LTD., Saitama (JP)

(72) Inventors: Takuma Terada, Tokyo (JP); Tomoaki Yoshinaga, Tokyo (JP)

(73) Assignee: Clarion Co., Ltd., Saitama (JP)

( * ) Notice: Subject to any disclaimer, the term of this patent is extended or adjusted under 35 U.S.C. 154(b) by 0 days.

(21) Appl. No.: 14/063,193

(22) Filed: Oct. 25, 2013

(65) Prior Publication Data

US 2014/0172231 A1 Jun. 19, 2014

(30) Foreign Application Priority Data

Dec. 14, 2012 (JP) .................. 2012-273081

(51) Int. Cl.
| | | |
|---|---|---|
| G01C 21/36 | (2006.01) | |
| G06T 1/00 | (2006.01) | |
| G06T 7/20 | (2006.01) | |
| G06T 7/60 | (2006.01) | |
| G06K 9/00 | (2006.01) | |
| G06F 3/01 | (2006.01) | |
| G06F 3/03 | (2006.01) | |
| G06F 3/00 | (2006.01) | |

(52) U.S. Cl.
CPC .......... G06K 9/00389 (2013.01); G06F 3/005 (2013.01); G06F 3/017 (2013.01); G06F 3/0304 (2013.01); G06K 9/00832 (2013.01)

(58) Field of Classification Search
CPC ....... G06K 9/00389; G06F 3/005; G06F 3/017
USPC ........................................ 701/36; 382/181
See application file for complete search history.

(56) References Cited

U.S. PATENT DOCUMENTS

| 7,289,645 B2 * | 10/2007 | Yamamoto ............. B60K 37/06 |
| | | 382/104 |
| 2004/0190753 A1 | 9/2004 | Sakagami et al. |
| 2006/0136846 A1 * | 6/2006 | Im et al. ........................ 715/863 |
| 2009/0102788 A1 * | 4/2009 | Nishida et al. ................ 345/158 |
| 2010/0185341 A1 * | 7/2010 | Wilson et al. ..................... 701/1 |
| 2010/0202693 A1 * | 8/2010 | Song et al. ................... 382/190 |

(Continued)

FOREIGN PATENT DOCUMENTS

| JP | 2002-236534 A | 8/2002 |
| JP | 2003-131785 A | 5/2003 |

(Continued)

OTHER PUBLICATIONS

Japanese Office Action received in corresponding Japanese Application No. 2012-273081 dated Jul. 5, 2016.

*Primary Examiner* — John Q Nguyen
*Assistant Examiner* — Alan D Hutchinson
(74) *Attorney, Agent, or Firm* — Mattingly & Malur, PC

(57) ABSTRACT

A control apparatus to be connected to a route guidance apparatus, comprising: a hand information detection part for detecting information on a hand of a user from a taken image; and an operation command generation part for outputting a control command to at least one of the route guidance apparatus and a plurality of apparatus connected to the route guidance apparatus, the operation command generation part being configured to output the control command to the at least one of the route guidance apparatus and the plurality of apparatus based on a direction of the hand of the user detected by the hand information detection part.

6 Claims, 17 Drawing Sheets

(56) References Cited

U.S. PATENT DOCUMENTS

2011/0144543 A1* 6/2011 Tsuzuki ............... A61B 5/1114
                                                   600/595
2011/0286676 A1* 11/2011 El Dokor ..................... 382/225

FOREIGN PATENT DOCUMENTS

| JP | 2004-168264 A | 6/2004 |
| JP | 2004-171476 A | 6/2004 |
| JP | 2004-298988 A | 10/2004 |

\* cited by examiner

| MOTION | | OPERATION TARGET APPARATUS | FUNCTION |
|---|---|---|---|
| PATTERN a |  | AUDIO | PLAY/STOP |
| PATTERN b |  | | NEXT TRACK |
| PATTERN c |  | | PREVIOUS TRACK |
| PATTERN d |  | AIR CONDITIONER | INCREASE AIR VOLUME |
| PATTERN e |  | | INCREASE TEMPERATURE |
| PATTERN f |  | | DECREASE TEMPERATURE |

※ DIRECTIONS VIEWED FROM USER

CONTROL APPARATUS, VEHICLE, AND PORTABLE TERMINAL

CLAIM OF PRIORITY

The present application claims priority from Japanese patent application JP 2012-273081 filed on Dec. 14, 2012, the content of which is hereby incorporated by reference into this application.

BACKGROUND OF THE INVENTION

This invention relates to a control apparatus for guiding a route, and more particularly, to a control apparatus for recognizing a hand of a user and controlling an apparatus depending on a motion of the hand of the user.

Apparatus required for traveling, apparatus for creating a comfortable space, and switches operated by a user for controlling these apparatus are installed on a vehicle. Examples of the apparatus required for traveling include a steering wheel, mirrors, lights, and turn signals. Examples of the apparatus for creating a comfortable space include an air conditioner, an audio, and a car navigation apparatus.

As the number of these apparatus installed on the vehicle increases and as the number of functions for operating these apparatus increases, the number of switches tends to increase. The increase in number of the switches and the advanced functions of the switches make operations for controlling the apparatus complicate, resulting in a load imposed on a driver. Therefore, an interface for decreasing the number of switches to decrease the load imposed on the driver needs to be provided.

For example, as a non-contact interface, an interface for detecting a gesture of a user (behaviors including body motions and hand motions) and controlling an apparatus based on the detected gesture is known. This interface eliminates necessity of the operation of switches by the user, and enables control of apparatus by means of the gestures which can be intuitively used, resulting in reduction in the load imposed on the driver. However, in the case where the number of installed apparatus is large as exemplified by the vehicle, even if the number of switches can be reduced, the number of motions of gesture required for operating the apparatus increases, resulting in a load imposed on the driver.

As the background art in this technical field, there is a technology disclosed in Japanese Patent Application Laid-open No. 2004-171476. This publication includes a description, "The hand pattern switch apparatus recognizes, based on shapes of the hand and fingers recognized from an input image of the camera 3, that the driver (switch operator) has an intention to operate a switch apparatus, and then, the switch control target setting means 14 recognizes subsequent shapes and motions of the hand and fingers, selects one control target out of a plurality of grouped control targets, and outputs predetermined switch operation information. A plurality of switches for each of the control targets are grouped into sets of switches similar in form of operation and adjustment, and the switches in the set can be associated with each other so that it becomes easier to remember, resulting in an increase in operability".

SUMMARY OF THE INVENTION

According to Japanese Patent Application Laid-open No. 2004-171476, a plurality of motions are required for selecting an apparatus that the driver intends to operate and executing a function, and operability can thus decrease.

Moreover, when the driver controls an apparatus installed on the vehicle, it is necessary for an operation not to interfere driving, and to be confirmed without visual observation, and to be simple.

It is an object of this invention to provide a control apparatus for controlling a function of an apparatus by a simple operation without interfering a driving operation and without requiring visual observation.

The present invention is characterized by a control apparatus to be connected to a route guidance apparatus, comprising: a hand information detection part for detecting information on a hand of a user from a taken image; and an operation command generation part for outputting a control command to at least one of the route guidance apparatus and a plurality of apparatus connected to the route guidance apparatus, the operation command generation part being configured to output the control command to the at least one of the route guidance apparatus and the plurality of apparatus based on a direction of the hand of the user detected by the hand information detection part.

This invention enables to provide a control apparatus for controlling a function of an apparatus by a simple operation without interfering a driving operation and without requiring visual observation.

A brief description is now given of effects provided by the exemplary embodiment of this invention disclosed in this application.

BRIEF DESCRIPTION OF THE DRAWINGS

The present invention can be appreciated by the description which follows in conjunction with the following figures, wherein.

DETAILED DESCRIPTION OF THE PREFERRED EMBODIMENTS

Figure 1:
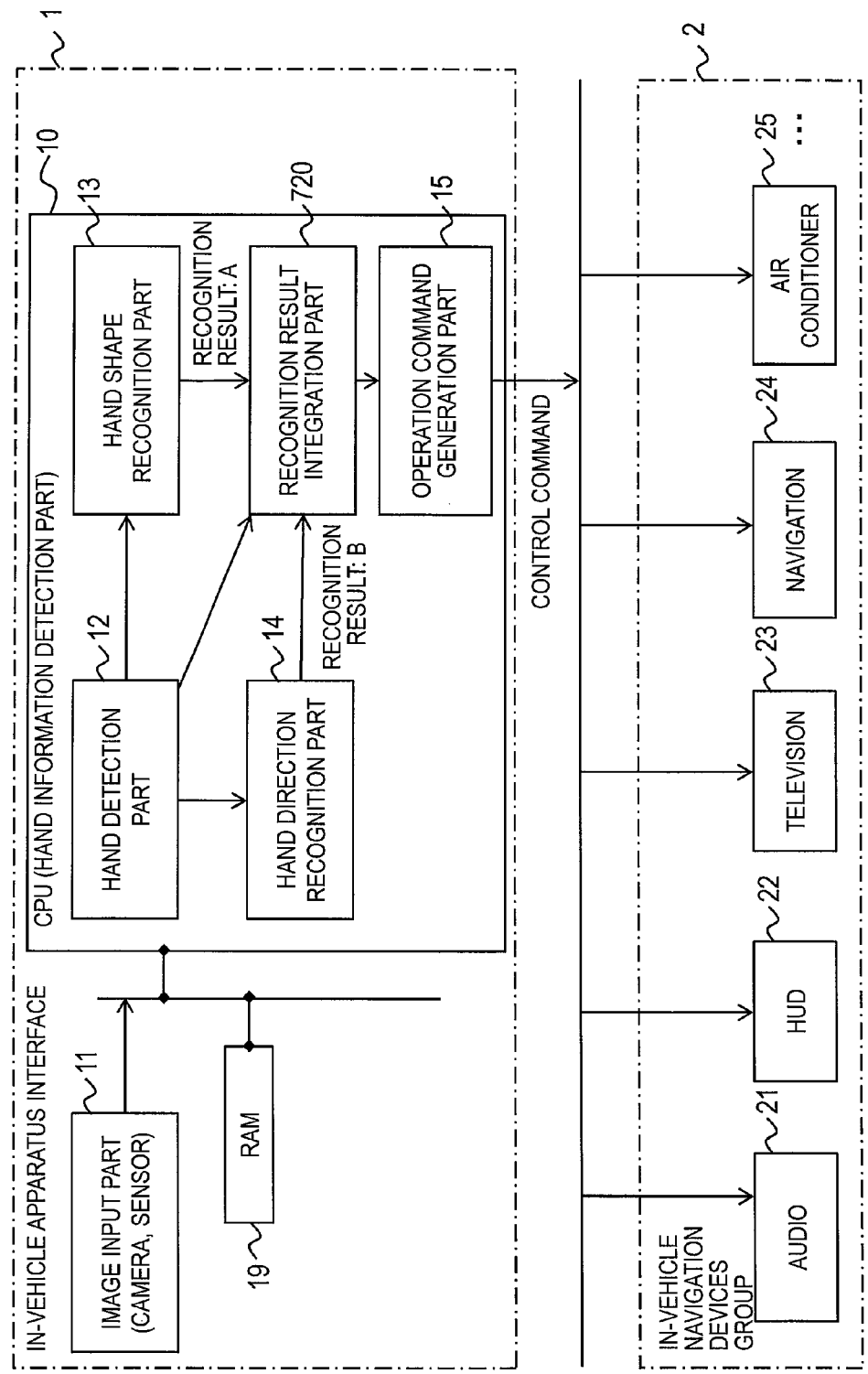
FIG. 1 is a block diagram of a vehicle on which an in-vehicle apparatus interface according to a first embodiment of this invention is installed.

A description is now given of embodiments of this invention referring to the drawings.

First Embodiment

Referring to FIGS. 1 to 16, a description is now given of a first embodiment of this invention.

In this embodiment, a description is given of an example of a control apparatus (in-vehicle navigation device) which can control functions of apparatus depending on a hand shape and a hand direction of a user. For example, the in-vehicle navigation devices are connected to a route guidance apparatus (navigation apparatus).

FIG. 1 is a block diagram of a vehicle on which an in-vehicle apparatus interface 1 according to the first embodiment of this invention is installed.

On the vehicle illustrated in FIG. 1, the in-vehicle apparatus interface 1 and an in-vehicle navigation devices group 2 are installed. The in-vehicle apparatus interface 1 recognizes a shape and a direction of the hand of the user to in-vehicle navigation devices included in the in-vehicle navigation devices group 2.

The in-vehicle apparatus interface 1 includes an image input part 11, a hand detection part 12, a hand shape recognition part 13, a hand direction recognition part 14, an operation command generation part 15, a recognition result integration part 720, a CPU 10, and a RAM 19. Programs corresponding to the hand detection part 12, the hand shape recognition part 13, the hand direction recognition part 14, the recognition result integration part 720, and the operation command generation part 15 are stored in the RAM 19, and the CPU 10 executes these programs. It should be noted that the hand detection part 12, the hand shape recognition part 13, the hand direction recognition part 14, the recognition result integration part 720, and the operation command generation part 15 are collectively referred to as "hand information detection part".

The image input part 11 is, for example, a camera, which acquires image data, and outputs the acquired image data to the hand detection part 12. For example, as the camera, an RGB camera for acquiring two-dimensional image data or an infrared camera capable of acquiring distance data may be used, but a camera other than these cameras may be used.

The hand detection part 12 detects information on the hand of the user from the image acquired by the image input part 11. The information on the hand of the user is, for example, information on an area of the hand, information on a position of the hand, and the like. Examples of a method of detecting the area information on the hand include the skin color detection for detecting locations having a specific color as the area of the hand and the AdaBoost for learning a large quantity of image data on the hand in advance and detecting the area of the hand based on the learned data. The details of the AdaBoost are described in P. Viola and M. Jones, "Rapid Object Detection using a Boosted Cascade of Simple Features", In Proc. IEEE Conf. on Computer Vision and Pattern Recognition (CVPR), Kauai, USA, 2001, and a description thereof is therefore omitted.

Moreover, the image data acquired by the image input part 11 may be different in background from the learned data depending on the direction and the position of the hand, and the texture may also change depending on a change in illumination environment. Thus, the hand detection part 12 may not detect the area information on the hand. In order to solve these problems, the hand information detection part 12 learns pieces of image data on the hand having a uniform background, and the hand detection part 12 detects the area of the hand based on the image data. The hand detection part 12 excludes image data inappropriate for the detection of the area of the hand from the learned image data, and uses the image data from which the inappropriate data is excluded for the detection of the area of the hand, thereby reducing errors in detection of the area of the hand.

The hand detection part 12 calculates the position information on the hand by calculating a two-dimensional coordinate of the center or the median point of the detected area of the hand. It should be noted that the hand detection part 12 preferably calculates the two-dimensional coordinate of the median point in order to reduce influence caused by a change in hand shape. Moreover, the hand detection part 12 can calculate the information on the motion of the hand by collecting a time sequence of the position information on the hand. The motion information on the hand can be represented by a direction and an amount of the motion.

The hand shape recognition part 13 recognizes the hand shape from the area information on the hand detected by the hand detection part 12, and outputs a recognition result to the recognition result integration part 720. A detailed description is given later of the hand shape recognition part 13 referring to FIG. 2. The hand direction recognition part 14 recognizes the direction of the hand from the wrist to the fingertip of the hand based on the area information on the hand and the position information on the hand detected by the hand detection part 12, and outputs a recognition result to the recognition result integration part 720. A detailed description is given later of the hand direction recognition part 14 referring to FIG. 4.

When the recognition results of the hand shape recognition part 13 and the hand direction recognition part 14 are input, the recognition result integration part 720 outputs the input recognition results to the operation command generation part 15.

The operation command generation part 15 selects an apparatus of a control target from among the apparatus included in the in-vehicle navigation devices group 2 based on one of the recognition results of the hand shape recognition part 13 and the hand direction recognition part 14 input from the recognition result integration part 720. Then, the operation command generation part 15 outputs, based on the other recognition result, a control command to the apparatus selected as the control target so that the apparatus realizes a predetermined function, thereby controlling the apparatus of the control target.

In the following description, a description is given of such an example that the operation command generation part 15 selects an apparatus of a control target based on the recognition result (hand shape) of the hand shape recognition part 13, and identifies a function of the apparatus of the control target based on the recognition result (hand direction) of the hand direction recognition part 14. However, the apparatus of the control target may be selected based on the hand direction, and the function of the apparatus of the control target may be identified based on the hand shape.

To the operation command generation part 15, apparatus relationship information registering relationships between the respective recognition results of the hand shape recognition part 13 and the respective apparatus included in the in-vehicle navigation devices group 2, and function relationship information registering relationships between the respective recognition results of the hand direction recognition part 14 and the respective functions of the respective apparatus included in the in-vehicle navigation devices group 2 are set in advance.

The hand direction is a small motion, and it is therefore hard for the operation command generation part 15 to recognize the small change in the hand direction from the recognition result of the hand direction recognition part 14, and if the recognition of the small motion is tried, a function of the apparatus is erroneously identified due to a hand shake, and a control command not intended by the user can be output to the apparatus. Thus, the operation command generation part 15 holds, in order to prevent the control command not intended by the user from being output to the apparatus, a recognition result of the hand shape recognition part 13 and a recognition result of the hand direction recognition part 14 as prediction results in advance. The operation command generation part 15 prevents, by discarding the recognition results if the recognition results and the prediction results do not match, a control command not intended by the user from being output.

Moreover, a motion of the hand of the user is an instantaneous motion to instantaneously operate an apparatus, and it is thus a problem for the operation command generation part 15 at which timing the control command is output. For example, a description is given of a case where an apparatus is operated before the motion of the hand of the user stops. The hand starts moving in a first stop state and stops in a second stop state. In this case, the operation command generation part 15 acquires motion features of the user on a stage of the first stop state, and predicts a next motion. Then, the operation command generation part 15 starts processing after the hand starts moving, and completes the processing when the hand stops moving in the second stop state. If the recognition results and the prediction results match each other, the operation command generation part 15 outputs a control command corresponding to the recognition result. As a result, the control command can be issued at an early timing, and an erroneous operation can be reduced.

The in-vehicle navigation devices group 2 includes an audio 21, a head-up display (HUD) 22, a television 23, a navigation 24, and an air conditioner 25. Moreover, the in-vehicle navigation devices group 2 may include apparatus required for a travel of the vehicle. Examples of the apparatus required for the travel of the vehicle include lights, mirrors, turn signals, and wipers.

An apparatus including the in-vehicle apparatus interface 1 and the navigation 24 for guiding a route to a destination is referred to as "navigation apparatus (route guidance apparatus)". The navigation apparatus may be an apparatus installed on a vehicle such as a car navigation apparatus, or an apparatus carried by a user such as a high-performance cellular phone, as long as the navigation apparatus includes the in-vehicle apparatus interface 1 and the navigation 24.

Figure 2:
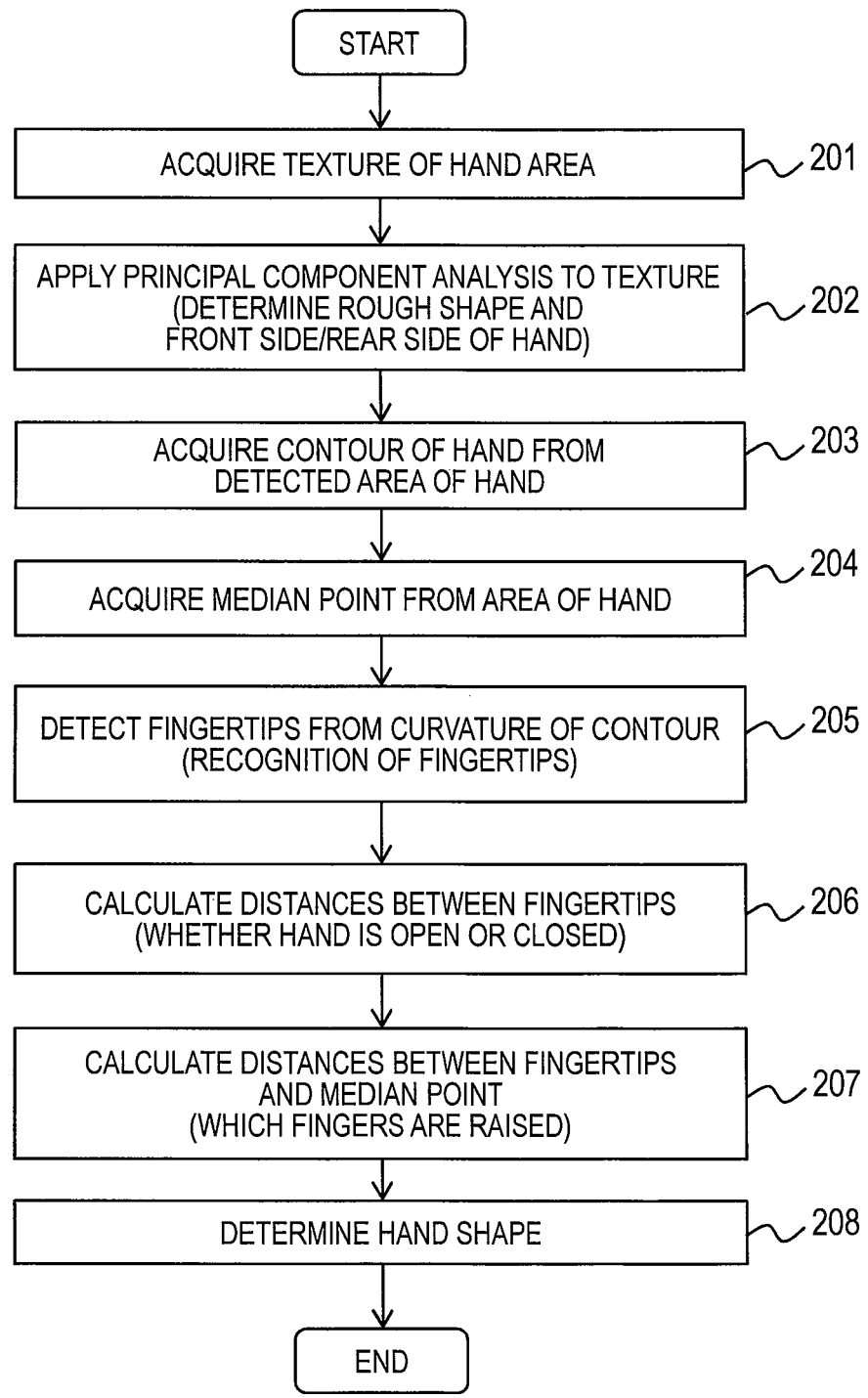
FIG. 2 is a flowchart of hand shape recognition processing by a hand shape recognition part according to the first embodiment of this invention.

FIG. 2 is a flowchart of hand shape recognition processing by the hand shape recognition part 13 according to the first embodiment of this invention.

The hand shape recognition processing is carried out when the information on the hand output by the hand detection part 12 is input to the hand shape recognition part 13. The hand shape recognition processing is processing of recognizing a hand shape based on a texture of the hand and distances from fingertips to the median point of the hand, and is carried out by the CPU (not shown) included in the in-vehicle apparatus interface 1.

First, the hand shape recognition part 13 acquires the texture of the hand from the area information on the hand included in the input information on the hand (201).

Then, the hand shape recognition part 13 applies the principal component analysis or the independent component analysis to the texture acquired in the processing of Step 201 to calculate a rough shape of the hand, and to determine whether the front side or the rear side of the hand is imaged (202).

Then, the hand shape recognition part 13 extracts a contour of the hand based on the area information on the hand included in the input information on the hand (203), and calculates the coordinate of the median point of the hand based on the area information on the hand (204).

Then, the hand shape recognition part 13 calculates a curvature of the contour extracted by the processing of Step 203, and detects locations having the calculated curvature belonging to a predetermined range of curvature representing the fingertip as the fingertips (205). Then, the hand shape recognition part 13 calculates distances between the fingertips detected by the processing of Step 205 (206).

Specifically, the hand shape recognition part 13 determines that the hand is in a closed state if the distances between the fingertips are equal to or less than a first predetermined value, and determines that the hand is in an open state if the distances between the fingertips are more than the first predetermined value. The processing of Step 205 may erroneously detect the wrist as the fingertip. In the processing of Step 206, the hand shape recognition part 13 assumes, if the distance between fingertips is larger than a second predetermined value, that one of the fingertips is the wrist, identifies, if there is a fingertip which is assumed to be the wrist and whose distance to another fingertip which is not assumed to be the wrist is larger than the second predetermined value, that this fingertip is the wrist, and removes the fingertip. As a result, the hand shape recognition part 13 can prevent the wrist from being erroneously recognized as the fingertip. It should be noted that a value larger than the first predetermined value is set to the second predetermined value.

Then, the hand shape recognition part 13 calculates distances between the respective fingertips detected by the processing of Step 206 and the median point (207). The hand shape recognition part 13 determines, if a distance between a fingertip and the median point is larger than a third predetermined value, that the fingertip is in an extended state, and determines, if the distance between the fingertip and the median point is equal to or less than the third predetermined value, that the fingertip is in a folded state. As a result, the hand shape recognition part 13 can identify which finger the user extends and which finger the user folds.

Then, the hand shape recognition part 13 recognizes the hand shape based on a result of the processing of Step 202 and results of the processing of Steps 205 to 207 (208) and finishes the processing.

The processing of Steps 201 and 202 is processing of recognizing the hand shape based on the texture of the hand, and the processing of Steps 203 to 207 is processing of recognizing the hand shape based on the distances between the fingertips and the median point of the hand.

Figure 3:
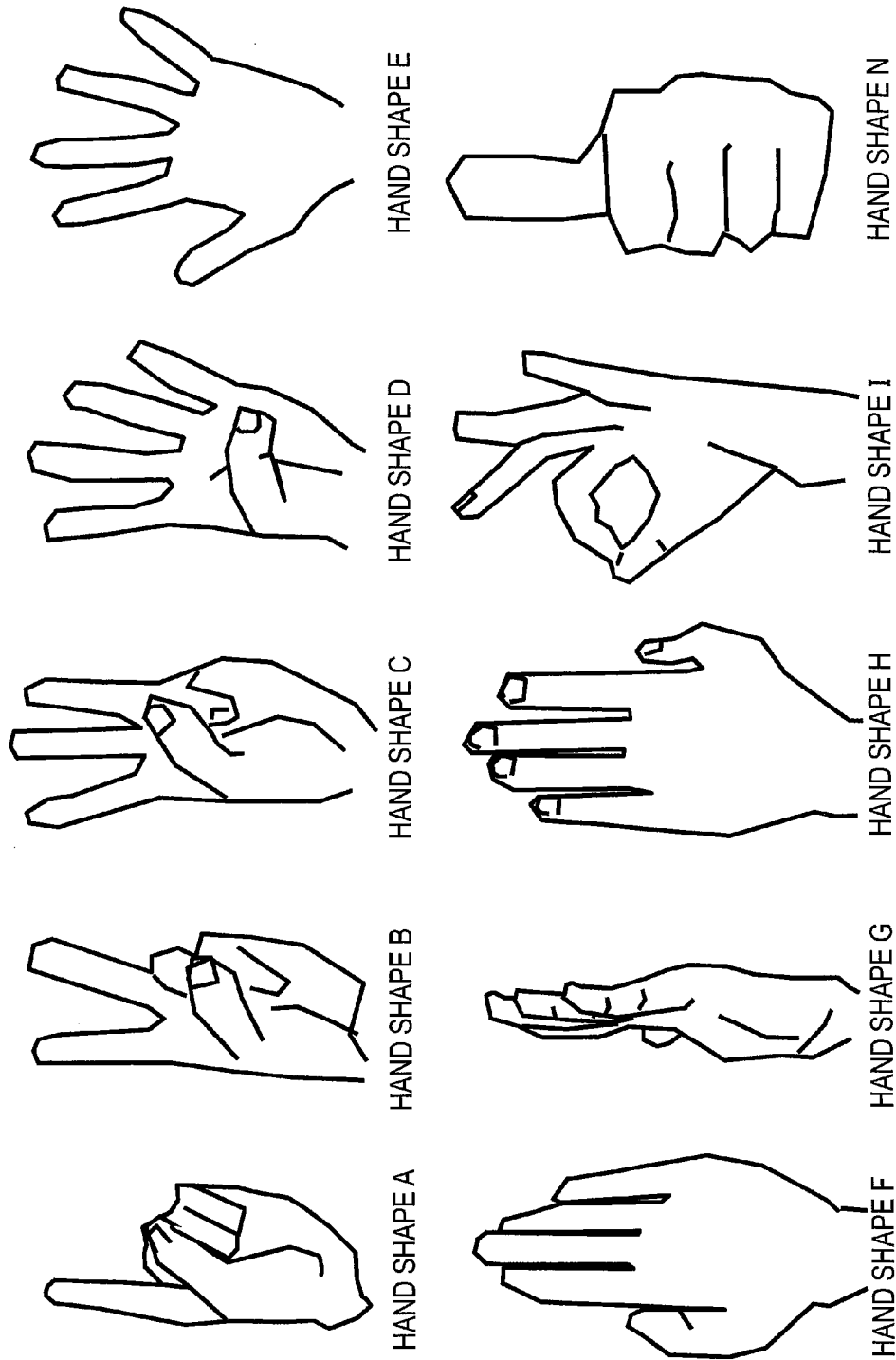
FIG. 3 is an explanatory diagram of an example of hand shape recognized by the hand shape recognition part according to the first embodiment of this invention.

The hand shape recognition processing illustrated in FIG. 2 carries out the processing of Steps 201 and 202 and the processing of Steps 203 to 207, but only any one of the processing of Steps 201 and 202 and the processing of Steps 203 to 207 may be carried out. However, for example, if only the processing of Steps 203 to 207 is carried out, the hand shape recognition part 13 may highly possibly fail to recognize whether the front side or the rear side of the hand such as the hand shape F or the hand shape H shown in FIG. 3 is imaged. Thus, the recognition of the hand shape can be carried out by the hand shape recognition part 13 more accurately by carrying out both the processing of Steps 201 and 202 and the processing of Steps 203 to 207.

In addition, the hand shape recognition part 13 may extract edges and a color edge histogram in each of local areas as feature amounts from the extracted image of the hand, and may recognize the shape of the hand by means of a class identifier such as the SVM, the AdaBoost, or the RandomForest from the extracted feature amounts.

FIG. 3 is an explanatory diagram of an example of the hand shape recognized by the hand shape recognition part 13 according to the first embodiment of this invention.

Examples of the hand shape recognized by the hand shape recognition part 13 include hand shapes A to N illustrated in FIG. 3.

The hand shape A is such a shape that the index finger is extended. The hand shape B is such a shape that the index finger and the middle finger are extended. The hand shape C is such a shape that the index finger, the middle finger, and the ring finger are extended. The hand shape D is such a shape that the index finger, the middle finger, the ring finger, and the little finger are extended. The hand shape E is such a shape that the thumb, the index finger, the middle finger, the ring finger, and the little finger are extended.

The hand shape F is such a shape that all the fingers are extended, and the palm of the hand (the rear side of the hand) is opposed to the camera. The hand shape G is such a shape that all the fingers are extended, and a little finger side is opposed to the camera. The hand shape H is such a shape that all the fingers are extended, and the back of the hand (the front side of the hand) is opposed to the camera. The hand shape I is such a shape that the index finger and the thumb form a circle. The hand shape N is such a shape that the thumb is extended.

These hand shapes A to N are associated with the apparatus of the control target, and registered to the apparatus relationship information set to the operation command generation part 15.

Moreover, the hand shape recognition part 13 may recognize hand shapes other than the hand shapes A to N.

Figure 4:
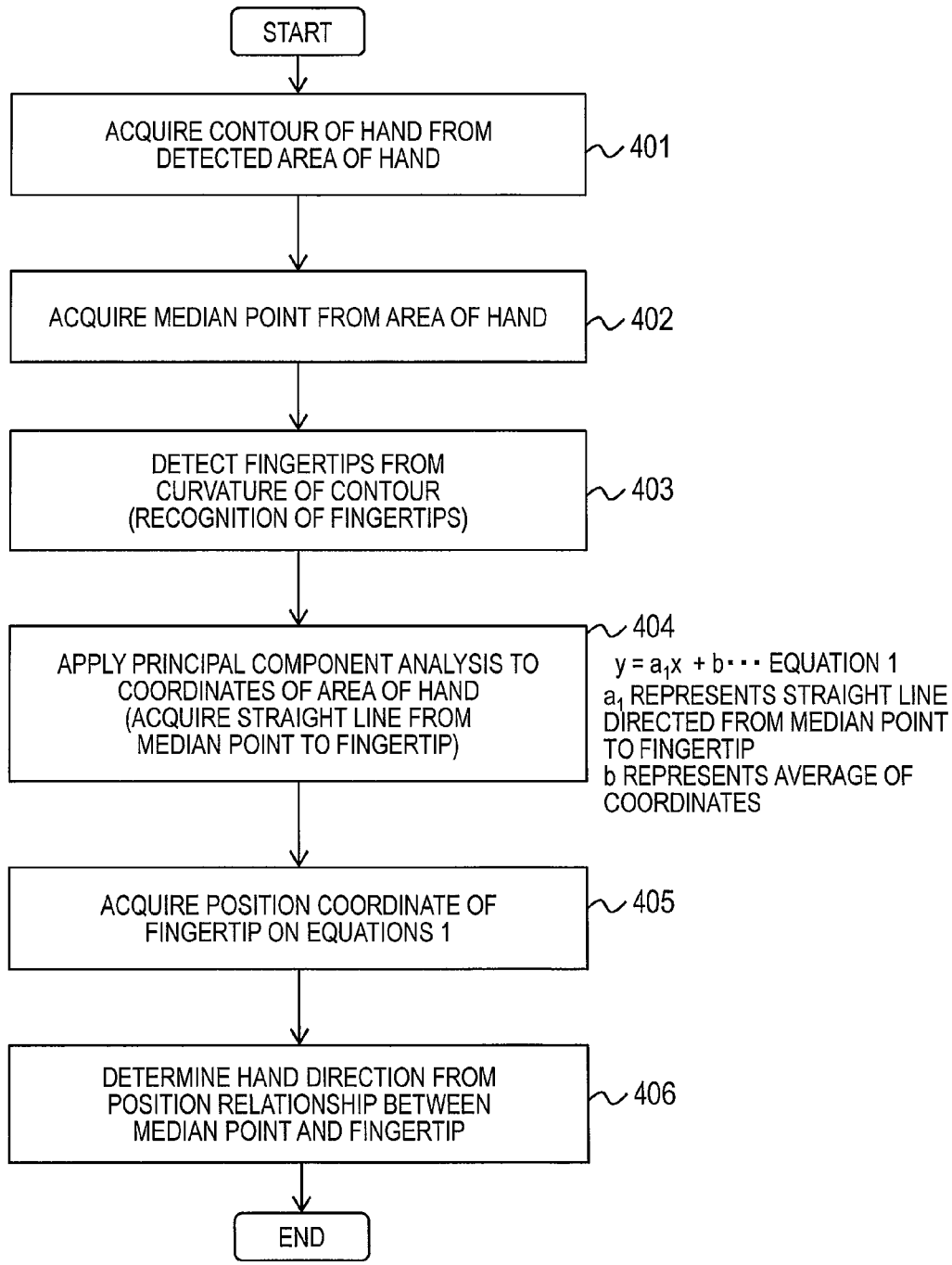
FIG. 4 a flowchart of hand direction recognition processing by a hand direction recognition part according to the first embodiment of this invention.

FIG. 4 is a flowchart of hand direction recognition processing by the hand direction recognition part 14 according to the first embodiment of this invention.

The hand direction recognition processing is carried out when the information on the hand output by the hand detection part 12 is input to the hand direction recognition part 14. The hand direction recognition processing is processing of recognizing a direction of the hand based on a line passing through the fingertip obtained by the principal component analysis and the median point, a coordinate of the fingertip, and a coordinate of the median point, and is carried out by the CPU (not shown) included in the in-vehicle apparatus interface 1.

First, the hand direction recognition part 14 extracts a contour of the hand based on the area information on the hand included in the input information on the hand (401), and calculates the coordinate of the median point of the hand based on the area information on the hand (402).

Then, the hand direction recognition part 14 calculates the curvature of the contour extracted by the processing of Step 401, and detects locations having the calculated curvature belonging to a predetermined range of curvature representing the fingertip as the fingertips (403).

Then, the hand direction recognition part 14 applies the principal component analysis for acquiring an axis having the maximum variance to the area information on the hand included in the input information on the hand, thereby calculating Equation 1 (404).

$$y = a_1 x + b \quad \text{Equation 1}$$

$a_1$ in Equation 1 represents a gradient of a line passing through the coordinate of the median point and the coordinate of the fingertip, and b in Equation 1 represents an average of coordinates of the area of the hand.

The axis having the maximum variance is calculated by applying the principal component analysis to the area information on the hand, and hence even if a plurality of fingertips are detected, one line is calculated. Moreover, even if the wrist is erroneously detected as a fingertip, the principal component analysis applied to the area information on the hand can prevent a line passing through the wrist erroneously detected as a fingertip and the median point from being calculated.

Any one of the directions of the line represented by Equation 1 calculated by the processing of Step 404 is the direction of the hand, and processing of Steps 405 and 406 is carried out in order to identify which of the directions of the line represented by Equation 1 is the direction of the hand.

The hand direction recognition part 14 acquires the coordinate of the fingertip on the line represented by Equation 1 calculated by the processing of Step 404 (405).

Then, the hand direction recognition part 14 recognizes the direction of the hand based on the coordinate of the fingertip acquired by the processing of Step 405, the coordinate of the median point, and Equation 1 calculated by the processing of Step 404 (406), and finishes the processing. Specifically, the hand direction recognition part 14 recognizes a direction from the coordinate of the median point to the coordinate of the fingertip out of the directions of the line represented by Equation 1 as the direction of the hand.

There is a modified example in the direction of the hand depending on individuals, and, for example, when the hand points upward, the direction of the hand varies depending on users. Moreover, there is a modified example in the speed of moving the hand depending on individuals. Therefore, learning data acquired by collecting data representing the modified example among users is set in advance to the hand direction recognition part 14, and the hand direction recognition part 14 extracts common points with the user subject to the recognition of the hand direction from the learning data to recognize the direction of the hand of the user.

For example, for a user who tends to have hesitation at a start of a motion of the hand and tends to move the hand faster than an ordinary motion, the hand direction recognition part 14 calculates the speed of the motion of the hand based on positions of the hand and times corresponding to these positions, and determines the motion as a motion for the apparatus control if the calculated speed is equal to or more than a predetermined speed. Moreover, the hand direction recognition part 14 determines that the motion is not the motion for the apparatus control if the calculated speed is less than the predetermined speed, and does not use the shape and the direction of the hand for the control of an apparatus in this case. It should be noted that the predetermined speed may be an average of the collected data representing the modified examples, or an arbitrary value.

Moreover, the hand direction recognition part 14 may extract edges and a color edge histogram in each of local areas as feature amounts from the extracted image of the hand, and may recognize the direction of the hand by determining which directions of the upward/downward and leftward/rightward directions defined in advance a direction determined by the extracted feature amounts is closest to by means of a class identifier such as the SVM, the AdaBoost, or the RandomForest. By using, as the feature amounts on this occasion, the histogram oriented gradient (HoG), the Haar, and the like, the feature of the hand can be extracted. Moreover, by using the Regression Forest or the like as the class identifier, a left/right rotation angle (−90 degrees to 90 degrees) of the hand can be estimated.

Figure 5:
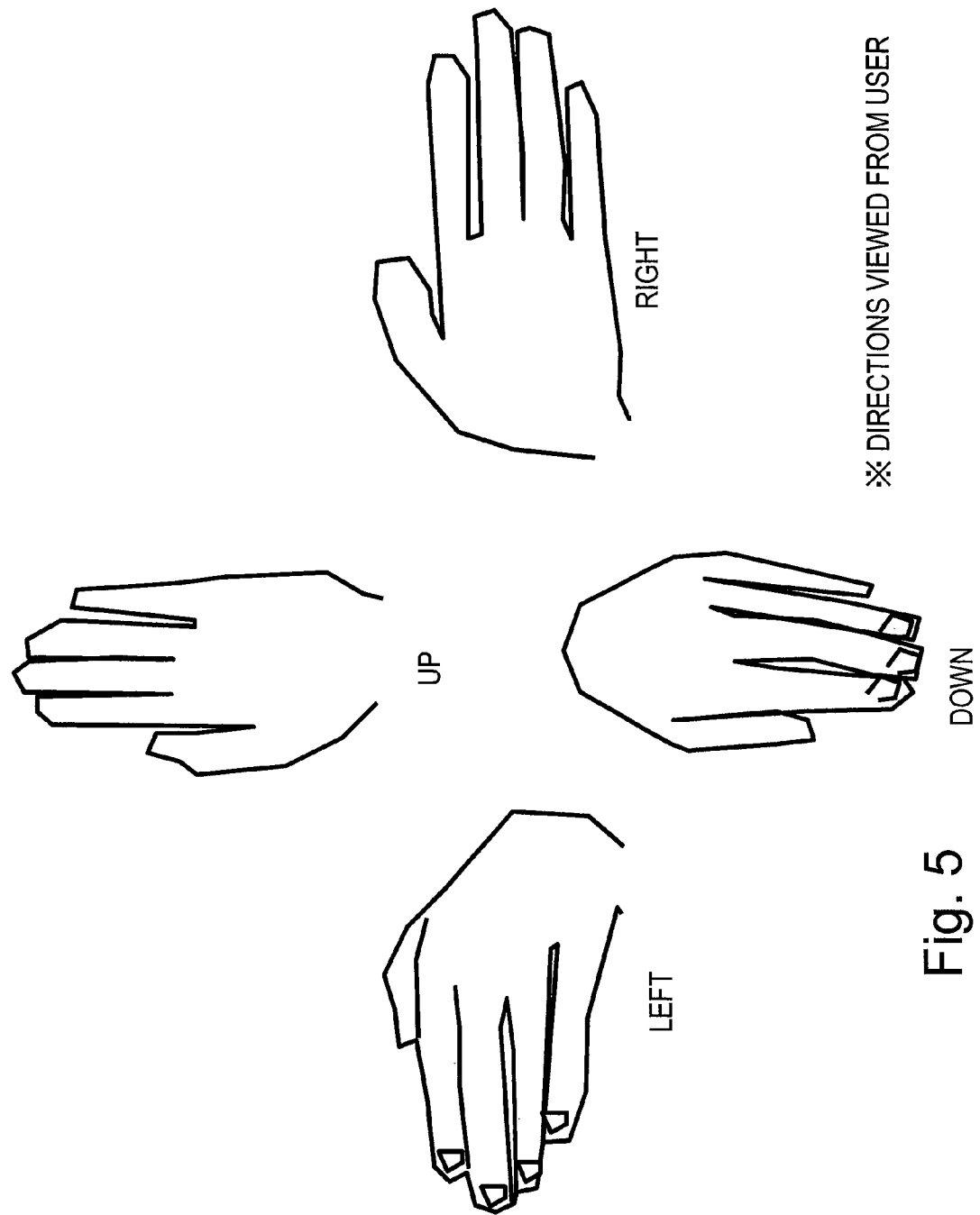
FIG. 5 is an explanatory diagram of an example of a direction of the hand recognized by the hand direction recognition part according to the first embodiment of this invention.

FIG. 5 is an explanatory diagram of an example of the direction of the hand recognized by the hand direction recognition part 14 according to the first embodiment of this invention.

Examples of the direction of the hand recognized by the hand direction recognition part 14 include UP, RIGHT, DOWN, and LEFT illustrated in FIG. 5.

The direction UP illustrated in FIG. 5 is such a state that the hand is directing upward viewed from the user, and the fingertips are located above the median point of the hand. The direction RIGHT illustrated in FIG. 5 is such a state that the hand is directing rightward viewed from the user, and the fingertips are located on the right side of the median point of the hand. The direction DOWN illustrated in FIG. 5 is such a state that the hand is directing downward viewed from the user, and the fingertips are located below the median point of the hand. The direction LEFT illustrated in FIG. 5 is such a state that the hand is directing leftward viewed from the user, and the fingertips are located on the left side of the median point of the hand.

These directions of the hand are associated with the apparatus of the control target, and registered to the apparatus relationship information set to the operation command generation part 15.

Moreover, the hand direction recognition part 14 may recognize directions of the hand other than the directions of the hand illustrated in FIG. 5.

Figure 6:
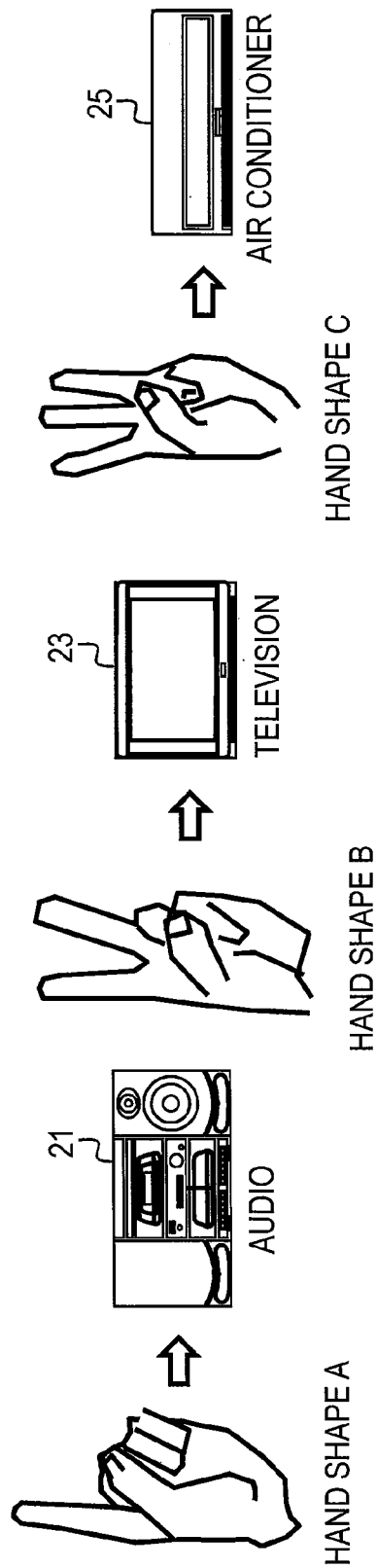
FIG. 6 is an explanatory diagram of a relationship between hand shapes and apparatus in the in-vehicle navigation devices group according to the first embodiment of this invention.

FIG. 6 is an explanatory diagram of a relationship between the hand shapes and the apparatus in the in-vehicle navigation devices group 2 according to the first embodiment of this invention.

The hand shape A is associated with the audio 21, and when the recognition result of the hand shape A is input from the hand shape recognition part 13, the operation command generation part 15 selects the audio 21 as the apparatus of the control target.

Moreover, the hand shape B is associated with the television 23, and the hand shape C is associated with the air conditioner 25.

It should be noted that these associations are set as the apparatus relationship information to the operation command generation part 15. Moreover, the associations between the hand shapes and the apparatus are not limited to the case illustrated in FIG. 6.

Figure 7:
FIG. 7 is an explanatory diagram of relationships between the hand shapes and hand directions and the functions of apparatus of the control target according to the first embodiment of this invention.
Figure 7:
Figure 7:
Figure 7:
Figure 7:
Figure 7:

FIG. 7 is an explanatory diagram of relationships between the hand shapes and the hand directions and the functions of the apparatus of the control target according to the first embodiment of this invention.

The operation command generation part 15 identifies an apparatus of the control target based on the recognition result of the hand shape recognition part 13, and identifies a function of the apparatus of the control target based on the recognition result of the hand direction recognition part 14. Then, the operation command generation part 15 outputs a control command for providing control to realize the identified function to the apparatus of the control target.

FIG. 7 illustrates six patterns including a pattern a to a pattern f.

The patterns a to c are those of the hand shape A, and the apparatus of the control target is thus the audio 21. The patterns d to f are those of the hand shape C, and the apparatus of the control target is thus the air conditioner 25.

In the pattern a, the hand shape A is directed upward, and the operation command generation part 15 provides control of a function to play or stop the audio 21. In the pattern b, the hand shape A is directed leftward, and the operation command generation part 15 provides control of a function to move to a next track of the audio 21. In the pattern c, the hand shape A is directed rightward, and the operation command generation part 15 provides control of a function to move to a previous track of the audio 21.

In the pattern d, the hand shape C is directed leftward, and the operation command generation part 15 provides control of a function to increase an air volume of the air conditioner 25. In the pattern e, the hand shape C is directed upward, and the operation command generation part 15 provides control of a function to increase a temperature of the air conditioner 25. In the pattern f, the hand shape C is directed downward, and the operation command generation part 15 provides control of a function to decrease the temperature of the air conditioner 25.

As described above, the identification of the function of the apparatus of the control target based on the direction of the hand permits the user to more intuitively operate the apparatus than the identification of the function of the apparatus of the control target based on the hand shape.

Figure 8:
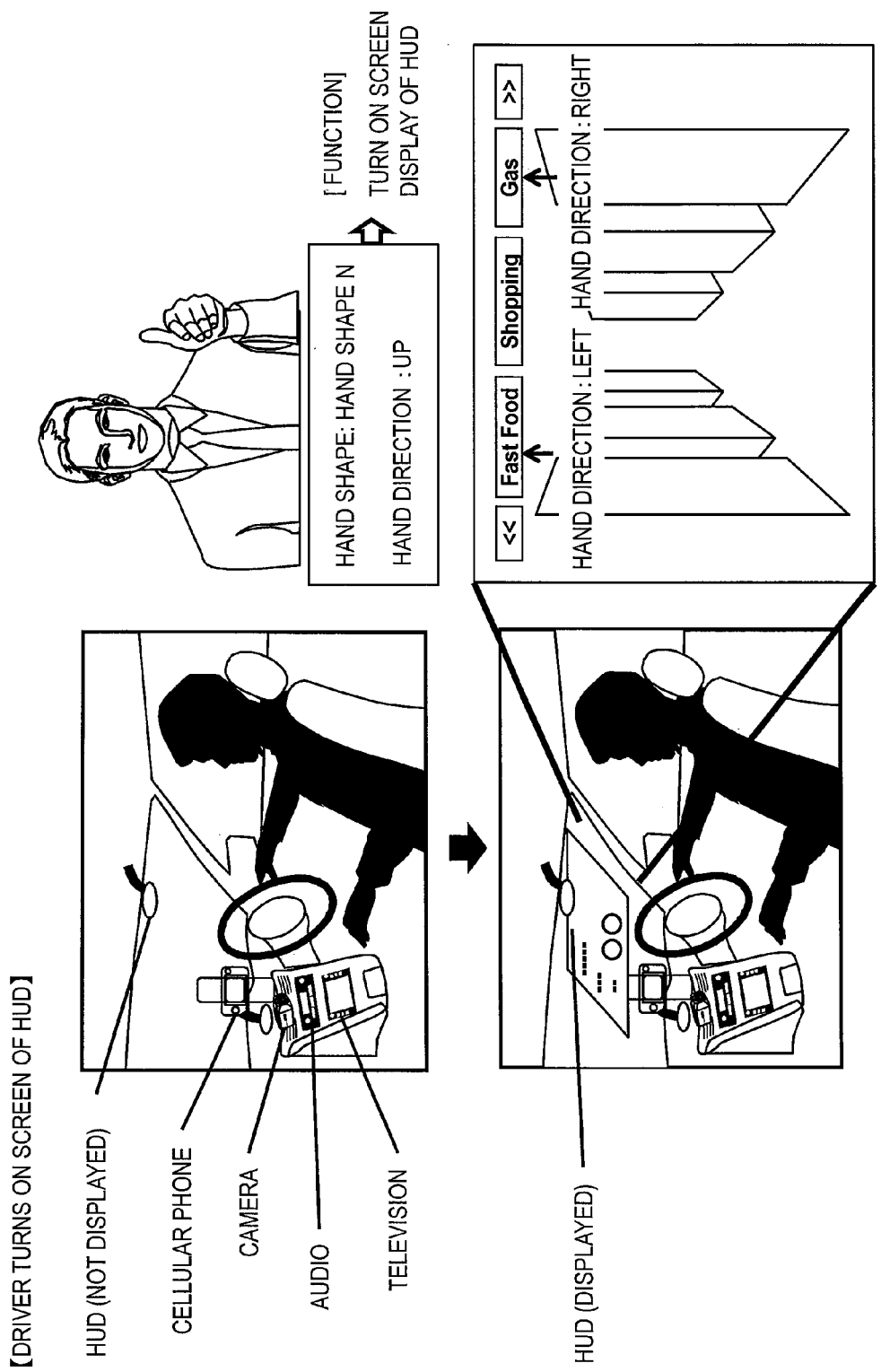
FIG. 8 is an explanatory diagram showing an example of an effect according to the first embodiment of this invention.

FIG. 8 is an explanatory diagram showing an example of an effect according to the first embodiment of this invention.

In FIG. 8, a description is given of a case where a function of the HUD 22 out of the apparatus included in the in-vehicle navigation devices group 2 is operated by the gesture of the driver. To the apparatus relationship information set to the operation command generation part 15, the relationship between the hand shape N and the HUD 22 is registered. Moreover, to the function relationship information set to the operation command generation part 15, a relationship between UP of the hand shape N and a function of starting a screen display of the HUD 22, a relationship between LEFT of the hand shape N and a function of switching to a previous screen of the HUD 22, and a relationship between RIGHT of the hand shape N and a function of switching to a next screen of the HUD 22 are registered.

The driver shapes the hand to the hand shape N and directs the hand upward in an imaged area of the camera in order to control the HUD 22 to start the screen display. As a result, the hand shape recognition part 13 recognizes that the hand shape of the driver taken by the camera is the hand shape N, and the hand direction recognition part 14 recognizes that the direction of the hand of the driver taken by the camera is UP. Thus, the operation command generation part 15 outputs a control command to start the screen display to the HUD 22.

The driver can switch the screen of the HUD 22 by directing the hand shape N rightward or leftward.

The HUD 22 usually does not include operation buttons and the like, and hence it is effective to enable the operation by means of the gesture of the user.

As described above, according to this embodiment, one motion formed by the hand shape and the hand direction of the user can provide the control of realizing the predetermined function of the apparatus of the control target out of the plurality of apparatus included in the in-vehicle navigation devices group 2. As a result, the function of the apparatus can be controlled by the simple operation without interrupting the driving operation and without requiring visual observation.

Second Embodiment

In this embodiment, a description is given of a navigation apparatus for setting a gesture area where the information on the hand is detected by the hand detection part 12 based on an area of the face of a user. As a result, an operation error of the apparatus by a gesture of a person other than the user operating the apparatus can be prevented.

Figure 9:
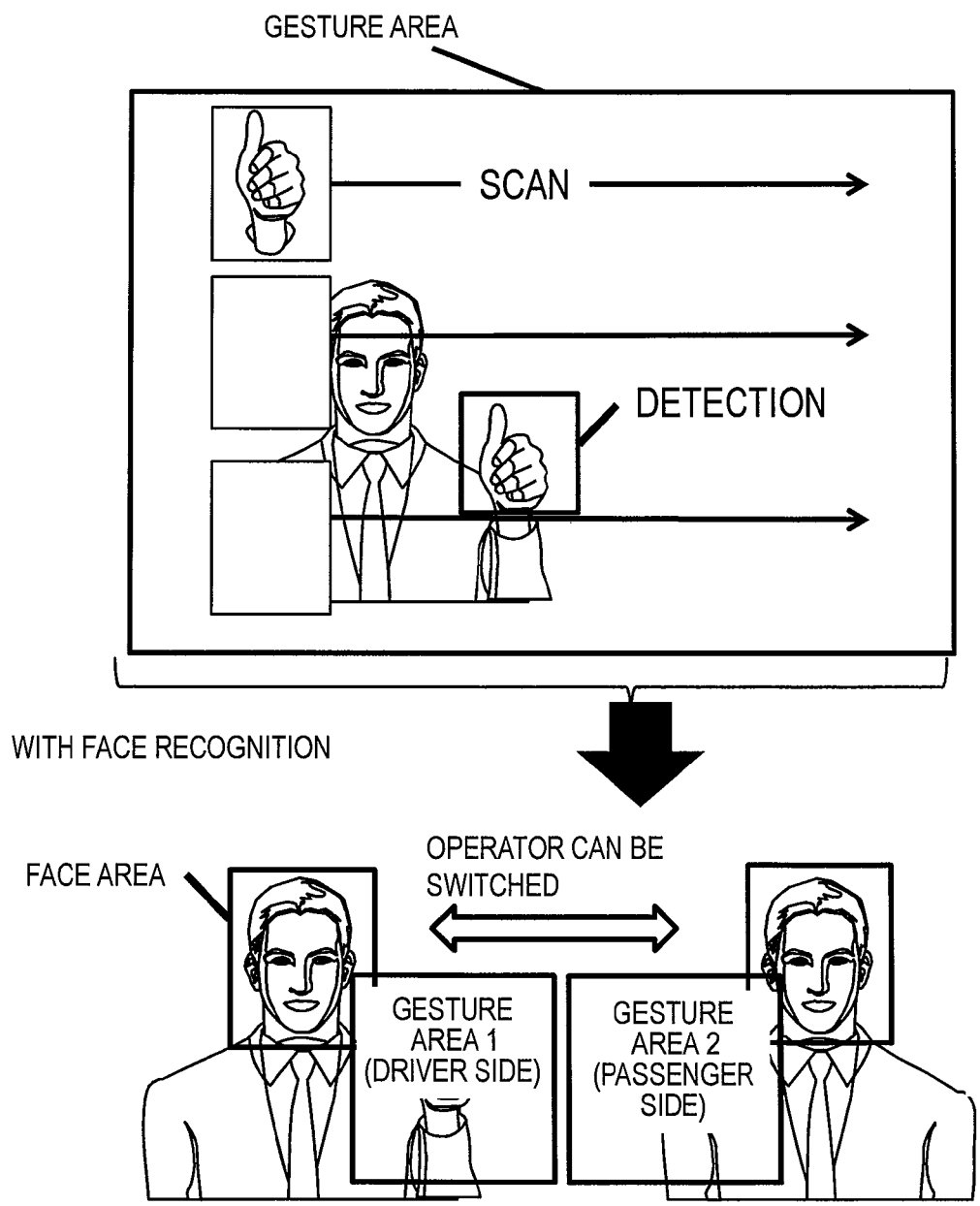
FIG. 9 is an explanatory diagram showing a gesture area according to a second embodiment of this invention.

FIG. 9 is an explanatory diagram showing the gesture area according to the second embodiment of this invention.

According to the first embodiment, the hand of the user is detected in the imaged area of the camera as illustrated in the upper part of FIG. 9. In other words, the entire imaged area of the camera is considered as the gesture area in the first embodiment.

According to the first embodiment, the hand of a passenger other than the driver, who is seated on a rear seat or a passenger's seat, can be detected, and hence a motion of the hand not intended by the passenger can be detected as a gesture for operating an apparatus, and the apparatus can be operated erroneously.

In this embodiment, the in-vehicle apparatus interface 1 detects the area of the face of the driver, and sets the gesture area to the hand detection part 12 based on the detected area of the face. For example, if the vehicle has a right-hand steering wheel, the in-vehicle apparatus interface 1 sets an area at the lower left of the detected area of the face of the driver as the gesture area. Moreover, if the vehicle has a left-hand steering wheel, the in-vehicle apparatus interface 1 sets an area at the lower right of the detected area of the face of the driver as the gesture area. Moreover, the hand detection part 12 can exclude an area where the hand is placed while the operation for controlling the in-vehicle navigation devices group 2 is not carried out (for example, an area where the hand is always placed such as the steering wheel) from the gesture area. For this purpose, the user may set the area where the hand is placed when the operation for controlling the in-vehicle navigation devices group 2 is not carried out such as a steering wheel position to the hand detection part 12, or the hand detection part 12 may estimate an area where the hand continuously exists for more than a certain period based on history, and set the area as the area where the hand is placed when the operation for controlling the in-vehicle navigation devices group 2 is not carried out.

The hand detection part 12 detects the information on the hand of the user from only the gesture area, and does not detect the information on the hand of the user from an imaged area other than the gesture area.

Moreover, when the in-vehicle apparatus interface 1 detects a predetermined hand shape and hand direction of the driver, the in-vehicle apparatus interface 1 switches the gesture area set to the hand part 12 to a predetermined area. For example, as illustrated in FIG. 9, a switched area is an area where the hand of a passenger seated on the passenger's seat can be detected. Moreover, the in-vehicle apparatus interface 1 may detect the area of the face of the passenger, and may identify the switched area based on the detected area of the face.

As described above, the gesture area can be limited from the entire imaged area, and an apparatus is prevented from being operated erroneously due to a motion of the hand not intended by the passenger.

Third Embodiment

In this embodiment, a description is given of illumination of the gesture area by an illumination apparatus. As a result, a constant illumination environment can be maintained and an erroneous detection of a gesture can be prevented on a vehicle where an illumination environment tends to change. This embodiment can be applied to the first and second embodiments.

Figure 10:
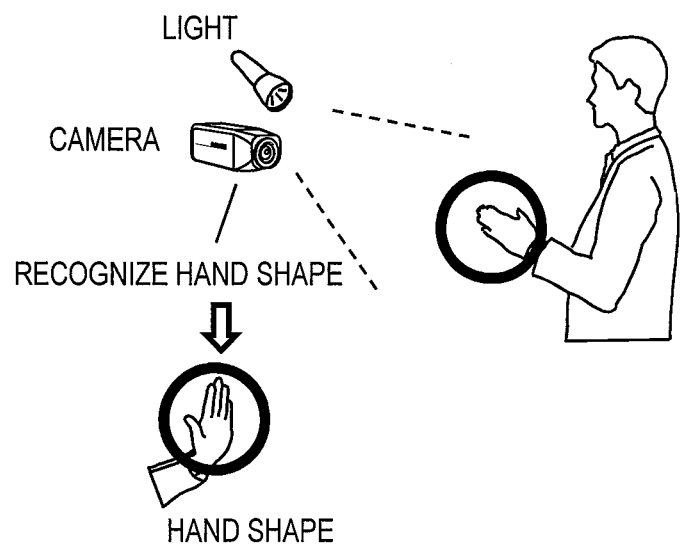
FIG. 10 is an explanatory diagram illustrating an illumination range of an illumination apparatus according to a third embodiment of this invention.

FIG. 10 is an explanatory diagram illustrating an illumination range of the illumination apparatus according to the third embodiment of this invention.

The illumination apparatus according to this embodiment may be a room lamp provided on the vehicle, an illumination apparatus provided on the camera, or an illumination apparatus installed on the vehicle independently of the camera.

The illumination apparatus is arranged so as to illuminate the gesture area. In the case of the first embodiment, the gesture area is the entire imaged area of the camera, and the illumination apparatus is thus arranged so as to illuminate an area where the driver moves the hand. Moreover, if the gesture area can be switched as in the second embodiment, when the in-vehicle apparatus interface 1 switches the gesture area, a direction of the illumination apparatus may be controlled to be a direction for illuminating the switched gesture area.

The illumination on the motion area of the hand of the user operating the apparatus can prevent an erroneous detection of the hand of a passenger other than the user in this way.

Moreover, if the illumination apparatus emits colored light, the hand detection part 12 can distinguish the color of the area of the hand out of the imaged area of the camera from the colors of other areas, thereby accurately detecting the area of the hand. Moreover, this configuration can further increase a hand shape recognition accuracy of the hand shape recognition part 13 and a hand direction recognition accuracy of the hand direction recognition part 14.

The illumination apparatus may always illuminate the gesture area, but the illumination apparatus may illuminate the gesture area only when the illumination is necessary. For example, the illumination of the gesture area by the illumination apparatus may start as soon as the illumination by the headlights of the vehicle starts. Moreover, when the hand is detected in the gesture area by an infrared sensor or the like, the illumination of the gesture area by the illumination apparatus may start.

Fourth Embodiment

In this embodiment, the camera is arranged in the vehicle so as to image the hand of the user. As a result, the background when the camera images the hand is a ceiling, and is hard to be influenced by a change in external environment (such as motions of persons seating on the rear seats, and a scenery outside the vehicle), and hence the erroneous detection of the gesture can be prevented.

Figure 11:
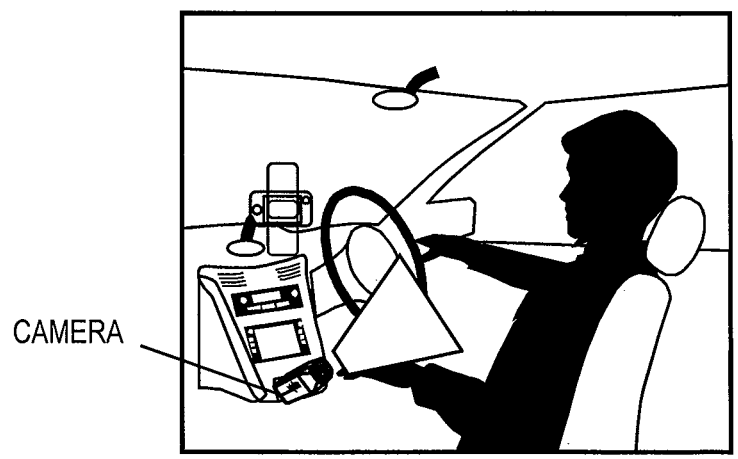
FIG. 11 is an explanatory diagram of an arranged position of a camera according to a fourth embodiment of this invention.

FIG. 11 is an explanatory diagram of an arranged position of the camera according to the fourth embodiment of this invention.

The camera is arranged at a position between the driver's seat and the passenger's seat and below the center of the steering wheel, and the camera is directed to the vicinity of the face of the user positioned above. As a result, the camera is arranged to image the hand of the user from below, and the background of an image taken by the camera can be the ceiling and is hard to be influenced by a change in the external environment, resulting in the prevention of the erroneous detection of the gesture.

Fifth Embodiment

In this embodiment, the operation command generation part 15 does not output a control command to an apparatus of the control target until a predetermined operation (trigger operation) is received from the user. As a result, a control command not intended by the user is prevented from being output to the apparatus.

For example, the trigger operation includes an operation by voice and an operation by the gesture of the hand. The operation by voice is detailed referring to FIGS. 12 and 13, and the operation by the gesture of the hand is detailed referring to FIG. 14.

First, a description is given of a case where the operation by voice serves as the trigger operation.

Figure 12:
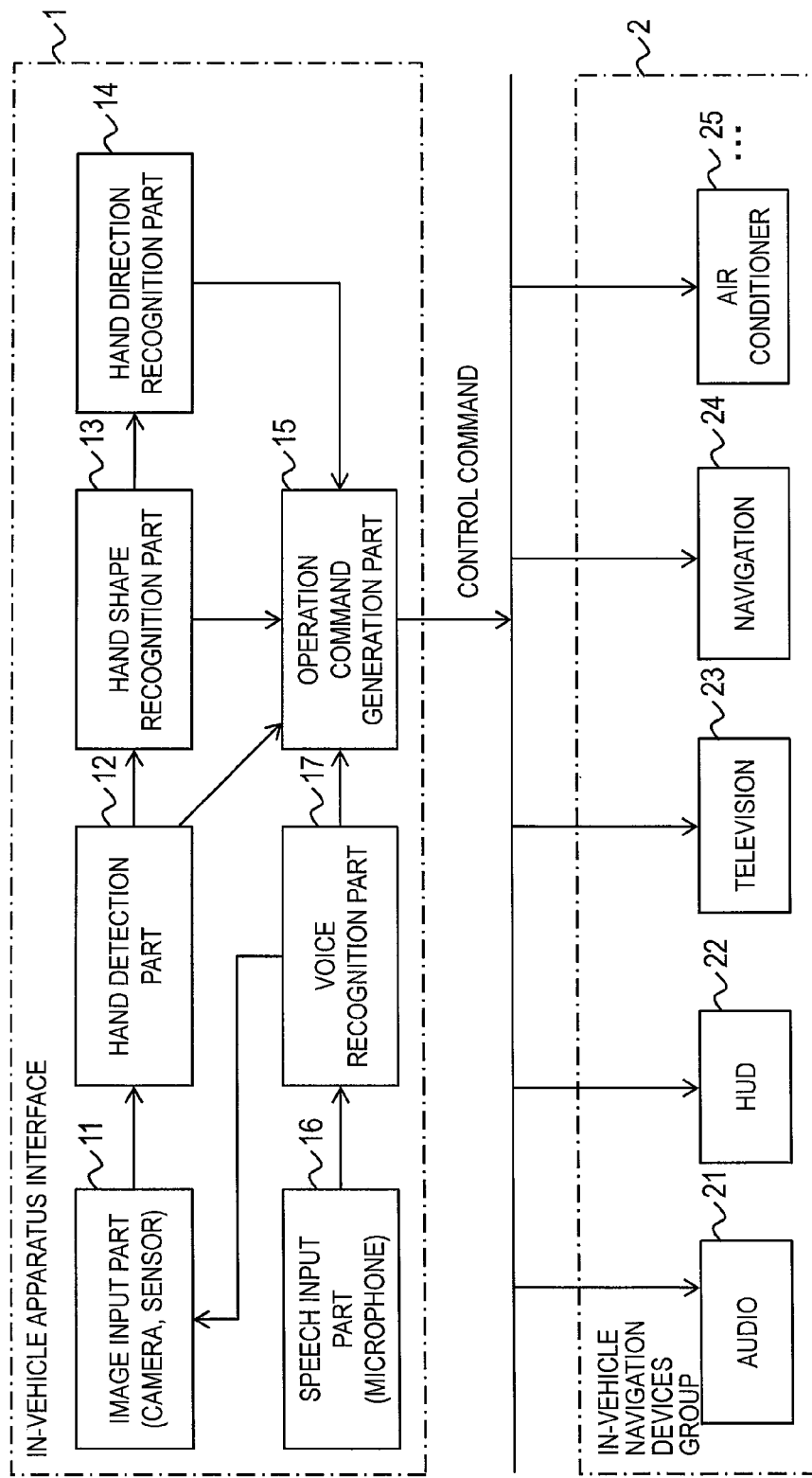
FIG. 12 is a block diagram of a vehicle on which an in-vehicle apparatus interface according to a fifth embodiment of this invention is installed.

FIG. 12 is a block diagram of a vehicle on which an in-vehicle apparatus interface 1 according to the fifth embodiment of this invention is installed. It should be noted that, out of the configurations illustrated in FIG. 12, like configurations as of FIG. 1 are denoted by like numerals, and a description thereof is therefore omitted.

The in-vehicle apparatus interface 1 of this embodiment includes a voice input part 16 and a voice recognition part 17 in addition to the image input part 11, the hand detection part 12, the hand shape recognition part 13, the hand direction recognition part 14, and the operation command generation part 15.

The voice input part 16 is a microphone or the like, which acquires voice data, and outputs the acquired voice data to the voice recognition part 17.

The voice recognition part 17 applies voice recognition to the voice data input from the voice input part 16, and if a voice recognition result is a predetermined voice representing the trigger operation, outputs a command to start outputting the imaged data to the hand detection part 12 to the image input part 11. Moreover, if the voice recognition result is a predetermined voice recognition result for controlling a function of an apparatus included in the in-vehicle navigation devices group 2, the voice recognition part 17 may output the voice recognition result via the recognition result integration part 720 to the operation command generation part 15, thereby controlling the operation command generation part 15 to output a control command corresponding to the voice recognition result to the apparatus included in the in-vehicle navigation devices group 2.

Figure 13:
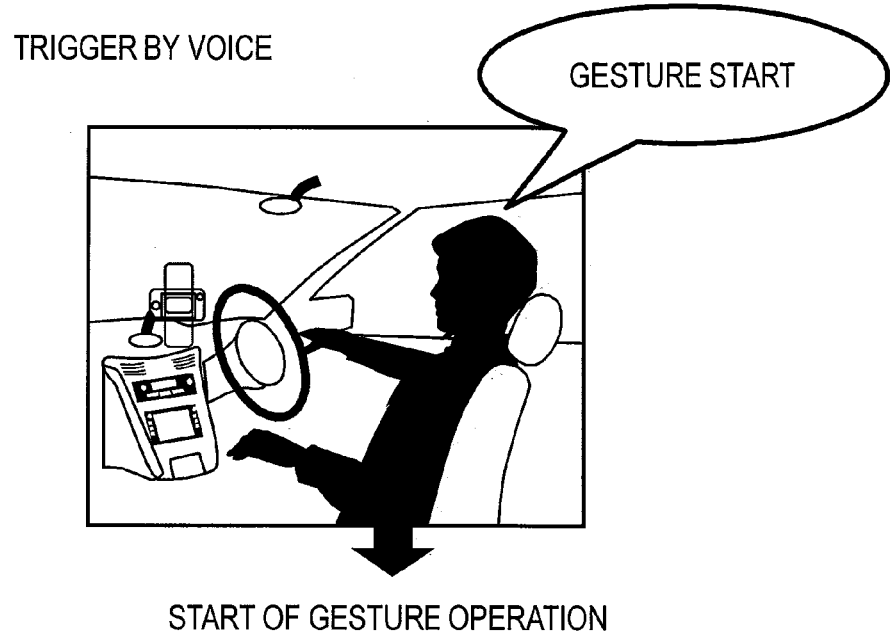
FIG. 13 is an explanatory diagram illustrating a trigger operation by voice according to the fifth embodiment of this invention.

FIG. 13 is an explanatory diagram illustrating the trigger operation by voice according to the fifth embodiment of this invention.

In FIG. 13, if the voice recognition result of the voice recognition part 17 is, for example, "gesture start", it is determined that the trigger operation is carried out, and the voice recognition part 17 outputs the output start command to the image input part 11.

As described above, when the predetermined voice is input to the in-vehicle apparatus interface 1, the input of the imaged data from the image input part 11 to the hand detection part 12 starts. As a result, if the user operates an apparatus included in the in-vehicle navigation devices group 2, the user utters the predetermined voice, and then controls the camera to read the hand shape and the hand direction, and the apparatus is thus prevented from being operated unintentionally by an unintended gesture.

In the trigger operation by voice, when the voice recognition part 17 recognizes a predetermined voice, the input of the imaged data from the image input part 11 to the hand detection part 12 starts. In other words, unless the voice recognition part 17 recognizes the predetermined voice, the recognition results of the hand shape recognition part 13 and the hand direction recognition part 14 are not input to the operation command generation part 15, and hence the operation command generation part 15 does not output a control command to an apparatus included in the in-vehicle navigation devices group 2, and only when the voice recognition part 17 recognizes the predetermined voice, the operation command generation part 15 outputs a control command to an apparatus included in the in-vehicle navigation devices group 2.

A description is now given of the case where an operation by a gesture of the hand serves as the trigger operation.

Figure 14:
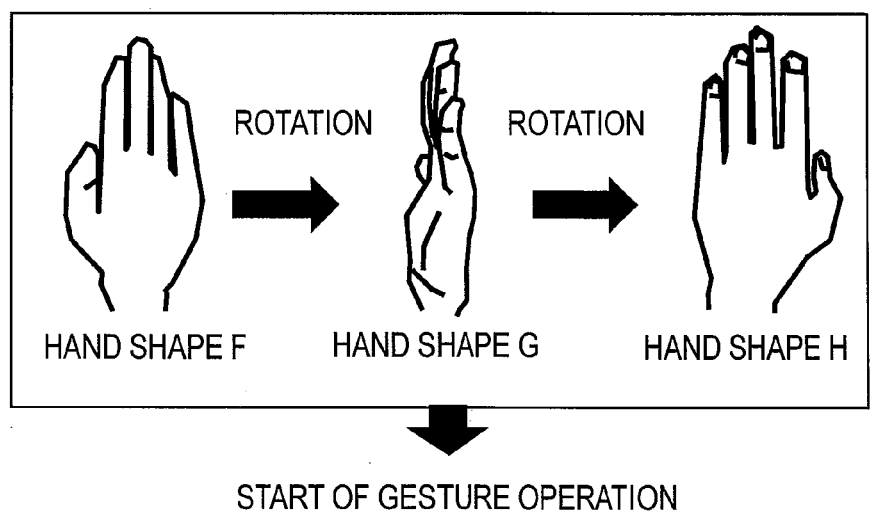
FIG. 14 is an explanatory diagram illustrating a trigger operation by a gesture of a hand according to the fifth embodiment of this invention.

FIG. 14 is an explanatory diagram illustrating the trigger operation by the gesture of the hand according to the fifth embodiment of this invention.

In FIG. 14, a gesture changing with time such as a hand shape F directing upward, a hand shape G directing upward, and a hand shape H directing upward is used as the trigger operation. The trigger operation is a simple rotation from the palm side of the hand to the back side of the hand in front of the camera, which takes the operability for the user into consideration.

When the operation command generation part 15 detects the trigger operation from the recognition results of the hand shape recognition part 13 and the hand direction recognition part 14, the operation command generation part 15 identifies an apparatus of the control target and a function of the apparatus of the control target based on the recognition results of the hand shape recognition part 13 and the hand direction recognition part 14 subsequent to the trigger operation, and permits the output of a control command to the apparatus of the control target. In other words, the operation command generation part 15 inhibits the output of a control command based on the recognition results of the hand shape recognition part 13 and the hand direction recognition part 14 input when the trigger operation is not detected.

The trigger operation by the gesture of the hand is not limited to the gesture changing with time, and may be a gesture formed by a single hand shape and a single hand direction, but if the gesture changing with time is used as the trigger operation, an unintended gesture is prevented from being detected as the trigger operation, thereby preventing an erroneous operation of the apparatus.

Moreover, a combination of an operation by the speed and an operation by the gesture of the hand may be a trigger operation.

Figure 15:
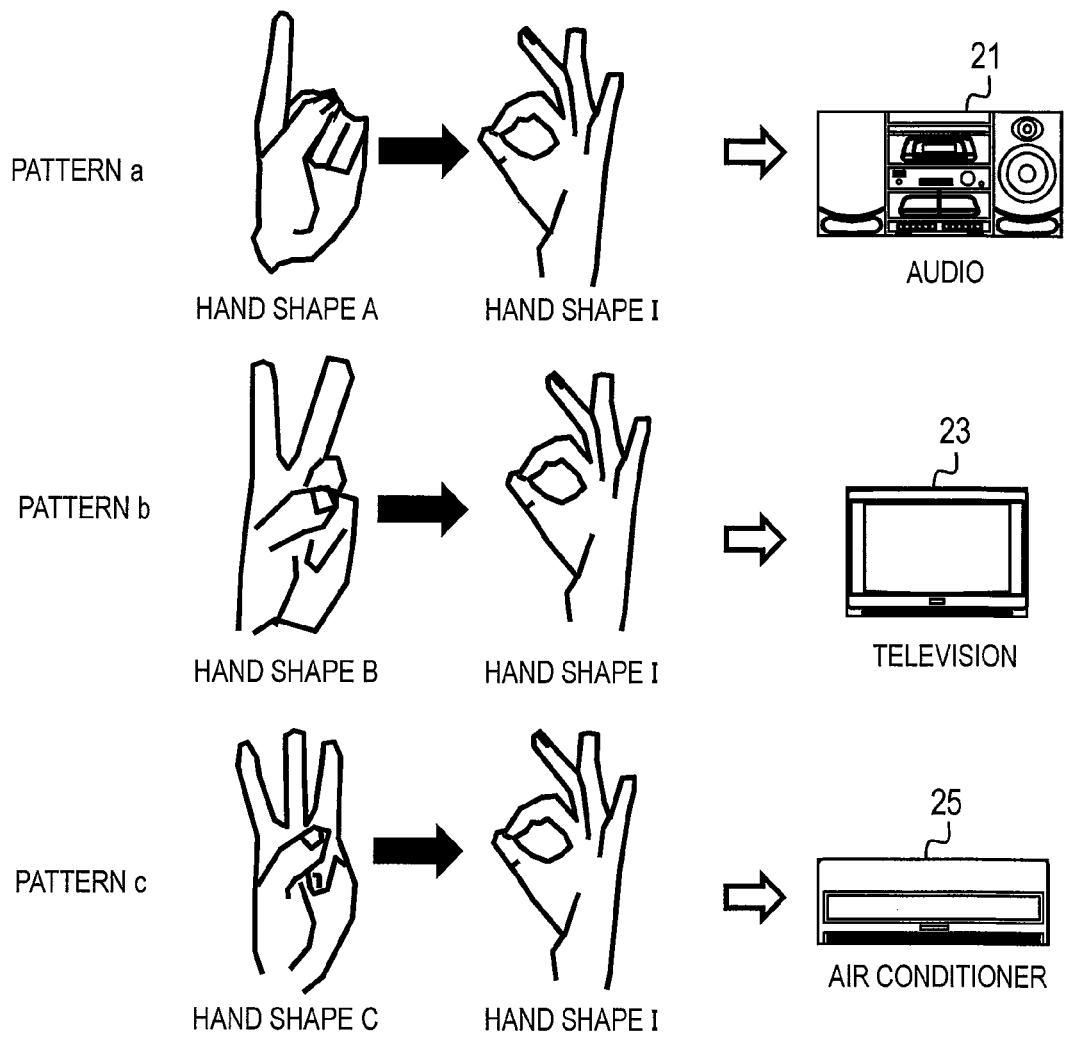
FIG. 15 is an explanatory diagram illustrating a trigger operation by the hand according to a modified example of the fifth embodiment of this invention.

According to the fifth embodiment, the trigger operation needs to be carried out before the gesture for operating an apparatus, but the trigger operation may be carried out after the gesture for operating an apparatus. Referring to FIG. 15, a description is given of this configuration as a modified example of the fifth embodiment.

FIG. 15 is an explanatory diagram illustrating the trigger operation by the hand according to the modified example of the fifth embodiment of this invention.

The trigger operation of this modified example is carried out after the gesture for operating an apparatus as described above, and, in FIG. 15, the trigger operation is a hand shape I directing upward.

When the recognition results serving as the trigger operation are input from the hand shape recognition part 13 and the hand direction recognition part 14, the operation command generation part 15 outputs a control command to an apparatus of the control target based on recognition results of the hand shape recognition part 13 and the hand direction recognition part 14 input immediately before the input recognition results. In other words, even if a control command to be output is determined, the operation command generation part 15 inhibits the control command from being output unless the gesture operation is input.

In a pattern a illustrated in FIG. 15, a recognition result of the hand shape A directing upward is input immediately before a recognition result of the hand shape I directing upward and serving as the trigger operation is input, and hence the operation command generation part 15 selects the audio 21 corresponding to the hand shape A as the apparatus of the control target, and outputs the control command to control the audio 21 to realize the function corresponding to the upward direction to the audio 21.

Further, in a pattern b illustrated in FIG. 15, a recognition result of the hand shape B directing upward is input immediately before a recognition result of the hand shape I directing upward and serving as the trigger operation is input, and hence the operation command generation part 15 selects the television 23 corresponding to the hand shape B as the apparatus of the control target, and outputs the control command to control the television 23 to realize the function corresponding to the upward direction to the television 23.

Further, in a pattern c illustrated in FIG. 15, a recognition result of the hand shape C directing upward is input immediately before a recognition result of the hand shape I directing upward and serving as the trigger operation is input, and hence the operation command generation part 15 selects the air conditioner 25 corresponding to the hand shape B as the apparatus of the control target, and outputs the control command to control the air conditioner 25 to realize the function corresponding to the upward direction to the air conditioner 25.

According to this modified example, a description has been given of the operation by the gesture of the hand as the trigger operation after the gesture for operating an apparatus, but the trigger operation may be an operation by voice, or a combination of an operation by the gesture of the hand and an operation by voice.

Moreover, in the fifth embodiment and the modified example of the fifth embodiment, a description has been given of the case where the operation by the gesture of the hand serves as the trigger operation and the case where the operation by the hand shape and the hand direction serves as the trigger operation, but the operation by only the hand shape may serve as the trigger operation. If the operation by only the hand direction serves as the trigger operation, the trigger operation may highly possibly be detected erroneously, and if operations including at least the hand shape serve as the trigger operation, the possibility of the erroneous detection of the trigger operation decreases.

Sixth Embodiment

In this embodiment, a description is given of a navigation apparatus combining the operation by the gesture of the hand and the operation by the voice. For example, when the user points to a building or the like outside the vehicle, and utters a question, the in-vehicle apparatus interface 1 outputs information on the building or the like in the pointed direction as a reply to the question based on the recognition results of the hand shape recognition part 13 and the hand direction recognition part 14 and position information obtained by the GPS and the like.

Figure 16:
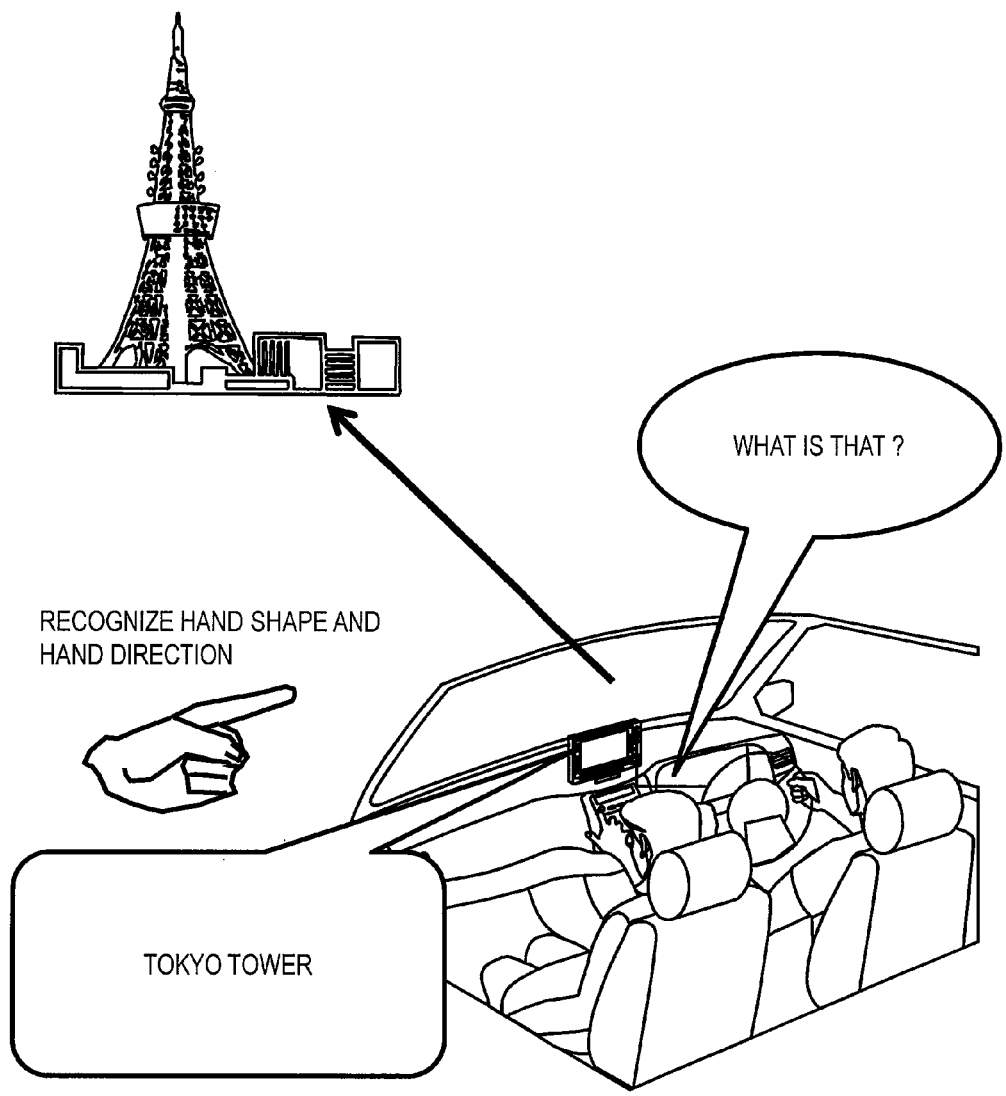
FIG. 16 is an explanatory diagram of a navigation apparatus for outputting a reply to a question by voice according to a sixth embodiment of this invention.

FIG. 16 is an explanatory diagram of the navigation apparatus for outputting a reply to a question by voice according to the sixth embodiment of this invention.

The in-vehicle apparatus interface 1 according to this embodiment, similarly to the in-vehicle apparatus interface 1 according to the fifth embodiment illustrated in FIG. 12, includes the image input part 11, the hand detection part 12, the hand shape recognition part 13, the hand direction recognition part 14, and the operation command generation part 15 as well as the voice input part 16 and the voice recognition part 17.

If the voice recognition part 17 recognizes voice data representing a question set in advance, a voice recognition result thereof is output via the recognition result integration part 720 to the operation command generation part 15. When the voice recognition result is input to the operation command generation part 15, the operation command generation part 15 identifies the direction to which the user points based on the hand shape, which is the recognition result of the hand shape recognition part 13, and the hand direction, which is the recognition result of the hand direction recognition part 14. Then, the operation command generation part 15 acquires an azimuth from an azimuth detection part (not shown), and identifies an azimuth pointed to by the user based on the acquired azimuth and the identified direction the user points to.

Then, the operation command generation part 15 acquires map information on the azimuth to which the user points from the current location from the map information stored in the navigation apparatus, and selects one piece of map information by using predetermined conditions from the acquired map information. Then, the operation command generation part 15 outputs a control command for outputting the selected map information as a reply to the question to speakers (not shown) included in the audio 21, the HUD 22, or the television 23. When the map information is acquired, the operation command generation part 15 may acquire the map information from a map information server connected to a network and storing map information.

The conditions used to select the one piece of map information from a plurality of pieces of map information are, for example, to select map information highest in importance or map information closest to the current location. Moreover, one piece of map information does not always need to be selected from the plurality of pieces of map information, and a plurality of pieces of map information may be used as the reply to the question of the user.

In FIG. 16, a user seated on the passenger's seat points to a direction of Tokyo Tower, and asks a question, "What is that?", and the navigation apparatus outputs a reply, "Tokyo Tower", via the display apparatus or the speakers.

The voice recognition part 17 may set a trigger operation for starting or finishing the voice recognition in order to prevent an unintended question of the user from being received. For example, the trigger operation is an operation by gesture of the hand, and an operation of moving the hand to the mouth of the user in such a hand shape that the fingertips are closed may be set as a trigger operation for controlling the voice recognition part 17 to start the voice recognition, or an operation of waving the hand may be set as a trigger operation for controlling the voice recognition part 17 to finish the voice recognition.

Seventh Embodiment

In this embodiment, a description is given of such a configuration that a portable terminal 701 which is connectable to the in-vehicle navigation devices group 2 recognizes the hand shape and the hand direction of the user, and controls the in-vehicle navigation devices group 2 via the in-vehicle apparatus interface 1.

Figure 17:
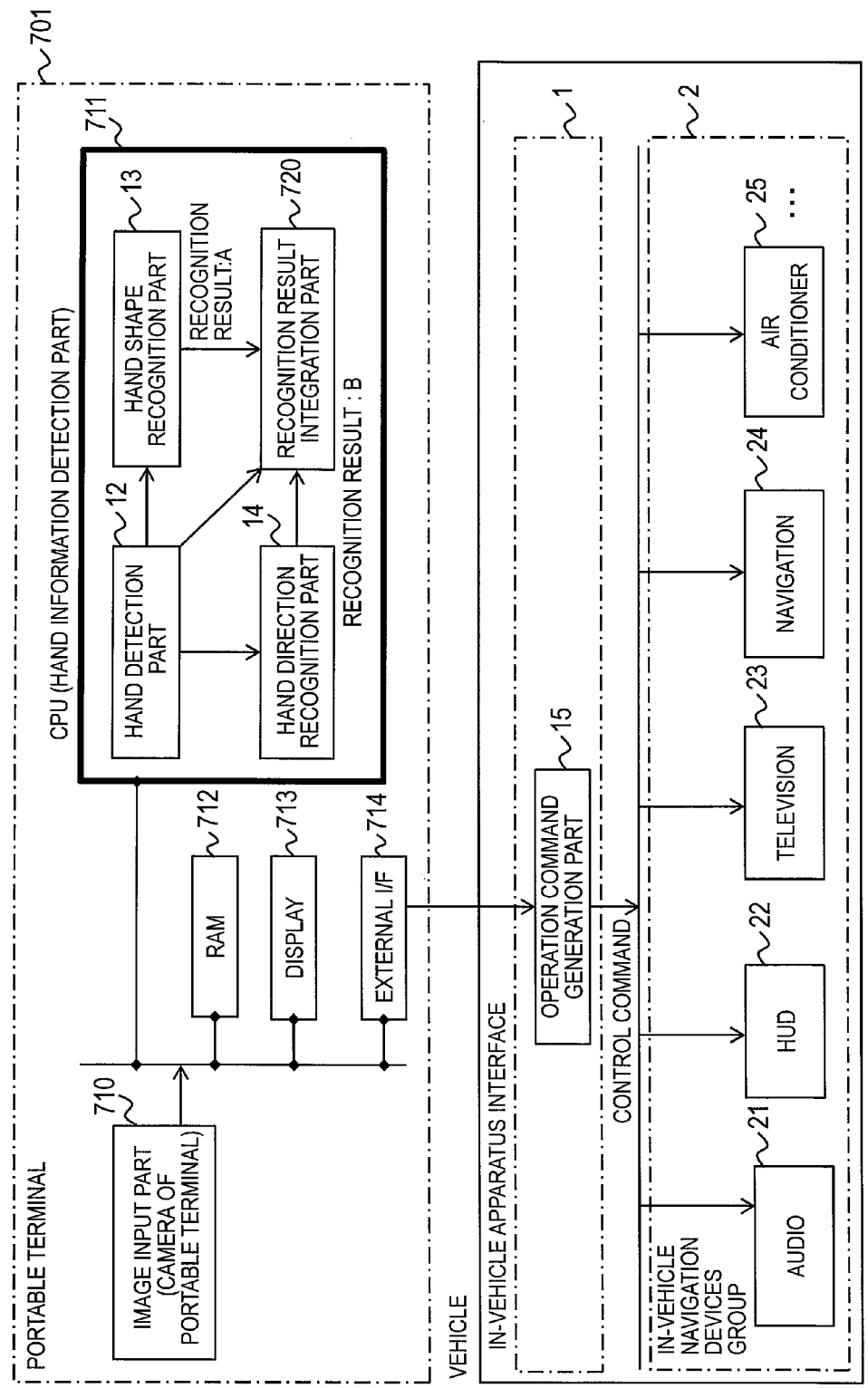
FIG. 17 is a block diagram of a portable terminal connected to the in-vehicle navigation devices group via an in-vehicle apparatus interface according to a seventh embodiment of this invention.

FIG. 17 is a block diagram of the portable terminal 701 connected to the in-vehicle navigation devices group 2 via the in-vehicle apparatus interface 1 according to the seventh embodiment of this invention. It should be noted that, out of the configurations illustrated in FIG. 17, like configurations as of FIG. 1 are denoted by like numerals, and a description thereof is therefore omitted.

The portable terminal 701 includes an image input part 710, the hand detection part 12, the hand shape recognition part 13, the hand direction recognition part 14, the recognition result integration part 720, a CPU 711, a RAM 712, a display 713, and an external interface (I/F) 714. The hand detection part 12, the hand shape recognition part 13, and the hand direction recognition part 14 are the same as those in the first embodiment, and a description thereof is therefore omitted.

The image input part 710 is a camera installed on the portable terminal 2, and outputs a taken image to the hand information detection part. It should be noted that a recognition result A of the hand shape recognition part 13 and a recognition result B of the hand direction recognition part 14 are input to the recognition result integration part 720. The recognition result integration part 720 transmits the input recognition result A and recognition result B as a recognition result via the external interface I/F 714 to the operation command generation part 15 included in the in-vehicle apparatus interface 1. Contents of the recognition result include a time, a position of the hand (coordinate), a size of the hand, the direction of the hand, and the shape of the hand.

Programs corresponding to the hand detection part 12, the hand shape recognition part 13, the hand direction recognition part 14, and the recognition result integration part 720 are stored in the RAM 712, and the CPU 711 executes these programs. It should be noted that the hand detection part 12, the hand shape recognition part 13, the hand direction recognition part 14, and the recognition result integration part 720 are collectively referred to as "hand information detection part". Moreover, recognition results of the hand of the user by the hand detection part 12, the hand shape recognition part 13, and the hand direction recognition part 14 are displayed on the display 713.

The external I/F 714 transmits, via a wireless communication, a wired connection, or the like, the recognition result to the operation command generation part 15 of the in-vehicle apparatus interface 1. The wireless communication includes the Bluetooth (trademark) and the Wi-Fi (trademark), and the wired connection includes a connection via the USB, a connection via the LAN, and a connection via a dedicated portable terminal.

When the operation command generation part 15 receives the recognition result, similarly to the operation command generation part 15 according to the first embodiment, the operation command generation part 15 identifies an apparatus of the control target, identifies a function of the apparatus of the control target, and outputs a control command for controlling the apparatus of the control target to realize the identified function to the apparatus of the control target.

According to this embodiment, the in-vehicle navigation devices group 2 is described as an example of the control target, but the control target may be a television, a personal computer (PC), or the like.

Eighth Embodiment

In this embodiment, a description is given of a recognition method for not recognizing a gesture not intended by the user but recognizing a gesture (gesture operation) intended by the user.

Figures 18, 19:
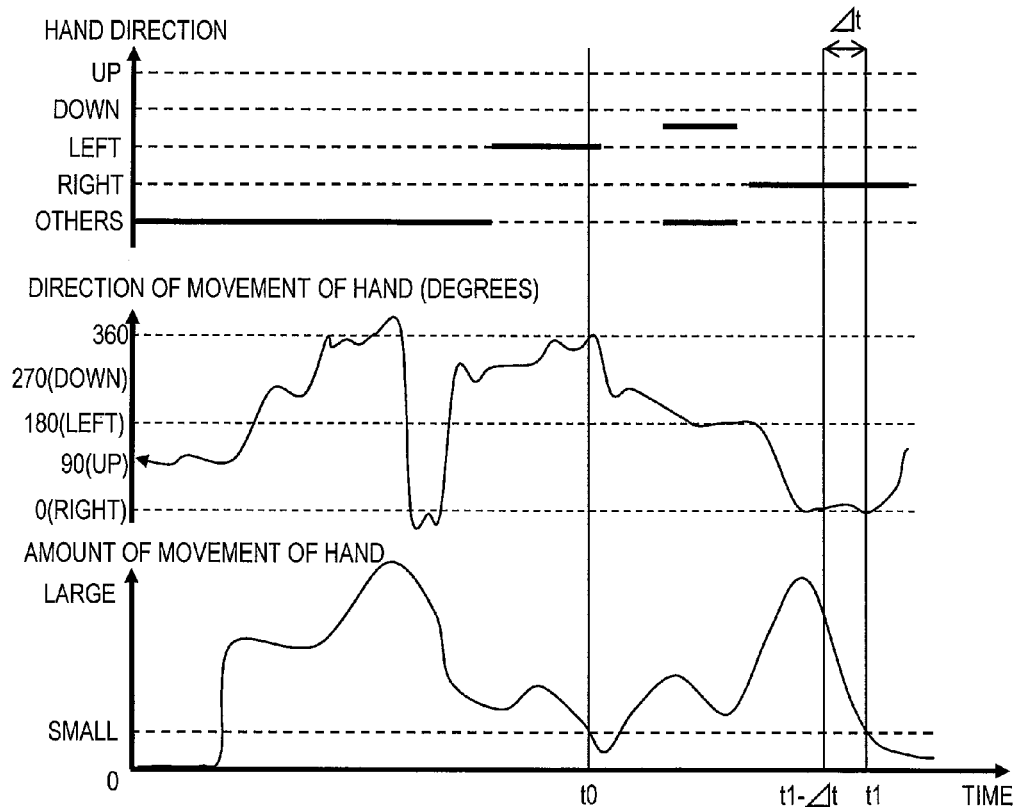
FIG. 18 is an explanatory diagram of processing of determining whether a gesture of the user is a gesture operation or not by a recognition result integration part according to an eighth embodiment of this invention.
FIG. 19 is an explanatory diagram illustrating relationships between the direction of the hand and a direction of movement of the hand, and a function of an audio 21 according to the eighth embodiment of this invention.

FIG. 18 is an explanatory diagram of processing of determining whether a gesture of the user is a gesture operation or not by the recognition result integration part 720 according to the eighth embodiment of this invention.

The recognition result integration part 720 treats, as time series data, a direction of movement of the hand and an amount of movement of the hand which can be calculated based on the information on the hand direction acquired by the hand direction recognition part 14 and the information on the hand position acquired by the hand information detection part. In this way, the recognition result integration part 720 according to this embodiment functions as a motion recognition part for recognizing a motion of the hand such as the direction of movement of the hand, the amount of movement of the hand, and the like. On this occasion, if the amount of movement of the hand is equal to or more than a predetermined threshold, the recognition result integration part 720 determines that the gesture operation is not finished, and does not output the input recognition result to the operation command generation part 15. As a result, the operation command generation part 15 does not output a control command, and hence an erroneous operation of the in-vehicle navigation devices group 2 caused by an unintended gesture of the user can be prevented. If the amount of movement of the hand is less than the predetermined threshold, the recognition result integration part 720 determines that the gesture operation is finished, and outputs the input recognition result to the operation command generation part 15. For example, the recognition result integration part 720 outputs only recognition results at times t0 and t1 illustrated in FIG. 18 to the operation command generation part 15. In other words, the times t0 and t1 illustrated in FIG. 18 are recognition target times.

Further, the recognition result integration part 720 may compare the direction of the hand and the direction of movement of the hand with each other at a time when the amount of movement of the hand becomes less than the threshold, may determine, if the direction of the hand and the direction of movement of the hand are the same, that the gesture operation has been carried out, and may output the recognition result to the operation command generation part 15. While the direction of the hand at the time t0 illustrated in FIG. 18 is leftward, the direction of movement of the hand is rightward. Thus, the recognition result integration part 720 does not determine that a gesture operation has been carried out, and does not output a recognition result. On the other hand, the direction of the hand and the direction of movement of the hand at the time t1 illustrated in FIG. 18 are rightward and the same, and hence the recognition result integration part 720 determines that the gesture at the time t1 is a gesture operation, and outputs the recognition result at the time t1 to the operation command generation part 15.

In this case, for the determination, the recognition result integration part 720 uses the direction of movement of the hand which had appeared continuously for a predetermined period before the amount of movement of the hand became smaller than the threshold. This configuration prevents an erroneous detection of the direction of movement of the hand when the direction of the hand cannot be determined horizontally or vertically due to a slight shake of the user in a state where the amount of movement of the hand becomes smaller than the threshold and the hand is stationary.

As described above, the recognition result integration part 720 does not recognize an unintended gesture of the user but can instantaneously recognize a gesture intended by the user by using both the direction of movement of the hand and the direction of the hand for determining whether the gesture is a gesture operation or not.

When the hand is moved in a predetermined direction, the hand is moved in the opposite direction in order to return the hand to an original position. Therefore, if the recognition result integration part 720 determines whether a gesture is a gesture operation or not based only on the direction of movement of the hand, the movement of the hand for returning the hand to the original position is also recognized as a gesture operation erroneously. For example, if the audio 21 is controlled to play a "next track" when the hand is moved rightward and to play a "previous track" when the hand is moved leftward, a motion to return the hand leftward is necessary after the hand is moved rightward, and hence the gesture of returning the hand leftward may be recognized as a gesture operation erroneously, and the audio 21 may play the "previous track".

On the other hand, if the recognition result integration part 720 determines whether a gesture is a gesture operation or not based only on the direction of the hand, the audio 21 is controlled to play the "next track" at a moment when the hand is directed rightward by chance during the operation. In order to prevent this control, there may be provided such a configuration that if the direction of the hand points to a predetermined direction for a predetermined period, the recognition result integration part 720 determines that the operation is a gesture operation, but the user needs to keep the direction of the hand in the predetermined direction for the predetermined period, resulting in an inconvenient operation. In contrast, as described above, if the recognition result integration part 720 uses the direction of movement of the hand and the direction of the hand for determining whether a gesture is a gesture operation or not, the erroneous detection of the movement of the hand returning to the original position, the erroneous detection when the direction of the hand matches the predetermined direction by chance, and the like can be prevented.

FIG. 19 is an explanatory diagram illustrating relationships between the direction of the hand and the direction of movement of the hand, and the function of the audio 21 according to the eighth embodiment of this invention. The apparatus can be controlled without recognizing a gesture erroneously by assigning the direction of the hand and the direction of movement of the hand to a function of an apparatus of the control target in this way.

In FIG. 19, a combination of the "upward" hand direction, and a "rightward, leftward, rightward, and leftward" hand movement is assigned to a "play/stop" function. In this case, the recognition result integration part 720 determines that the gesture in the case where the hand is in the "upward direction" and the hand moves "rightward, leftward, rightward, and leftward" (such as an operation of waving the hand leftward and rightward) as a gesture operation. On this occasion, the direction of the hand and the direction of movement of the hand are not necessarily the same, but if they are the same, the user can carry out a natural and intuitive operation.

Figure 20A:
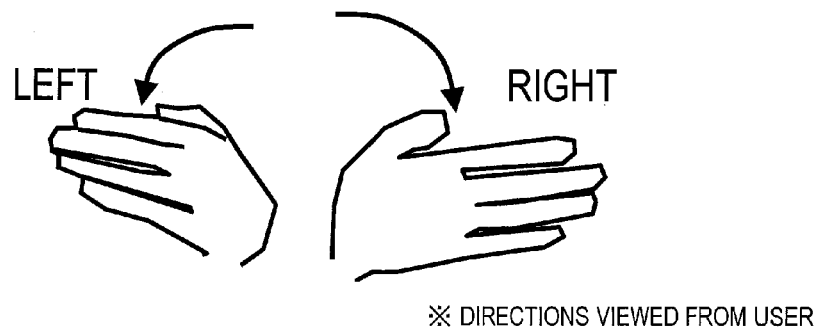
FIG. 20A is an explanatory diagram of a rotation motion of the hand of the user according to the eighth embodiment of this invention.
Figure 20B:
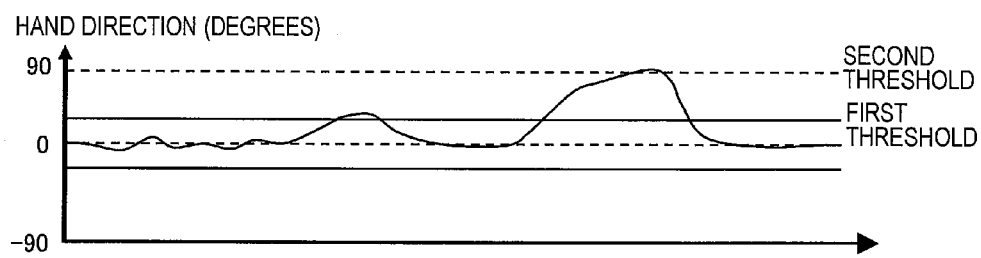
FIG. 20B is an explanatory diagram of a relationship between a rotation angle and thresholds according to the eighth embodiment of this invention.
Figure 20C:
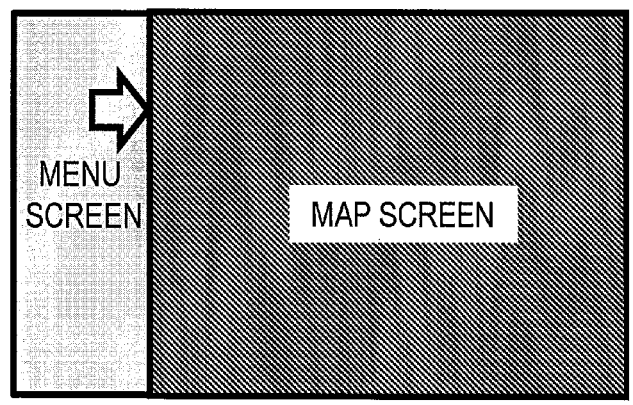
FIG. 20C is an explanatory diagram of a screen change of a navigation according to the eighth embodiment of this invention.

Referring to FIGS. 20A to 20C, a description is now given of a case where the recognition result integration part 720 calculates a rotation angle based on the information on the direction of the hand acquired by the hand direction recognition part 14 and the information on the position of the hand acquired by the hand information detection part, and the operation command generation part 15 controls an apparatus depending on the calculated rotation angle.

FIG. 20A is an explanatory diagram of a rotation motion of the hand of the user according to the eighth embodiment of this invention. The user can carry out, for example, a motion to rotate the hand leftward and rightward as illustrated in FIG. 20A as a gesture.

FIG. 20B is an explanatory diagram of a relationship between the rotation angle and thresholds according to the eighth embodiment of this invention.

A first threshold and a second threshold of the rotation angle are set to the recognition result integration part 720. On this occasion, the second threshold is set to be larger than the first threshold. If the rotation angle exceeds the first threshold or the second threshold, the recognition result integration part 720 outputs the recognition result of the hand shape recognition part 13, the recognition result of the hand direction recognition part 14, and information on which threshold is exceeded as the recognition result to the operation command generation part 15.

When the recognition result is input, the operation command generation part 15 identifies an apparatus of the control target and a function to be controlled of the apparatus based on the input recognition result of the hand shape recognition part 13 and the input recognition result of the hand direction recognition part 14. Then, if the operation command generation part 15 determines that the rotation angle exceeds the first threshold, the operation command generation part 15 enables the user to check control contents corresponding to the gesture of the user by means of video or audio.

For example, referring to FIG. 20C, a description is given of how the screen of the navigation 24 is changed. FIG. 20C is an explanatory diagram of the screen change of the navigation 24 according to the eighth embodiment of this invention.

When a map screen of the navigation 24 is displayed, and the user wants to change the map screen to a menu screen, if the operation command generation part 15 determines that the rotation angle exceeds the first threshold, the operation command generation part 15 displays the menu screen on a part of the map screen, and enables the user to check control contents after the change. Then, the user checks the menu screen. The control contents match desired control contents of the user, and thus, the user further rotates the hand. If the rotation angle exceeds the second threshold, the recognition result integration part 720 outputs the recognition result to the operation command generation part 15, and if the recognition result integration part 720 determines that the rotation angle exceeds the second threshold, the operation command generation part 15 determines that the user has decided to change the menu screen, and changes the entire map screen to the menu screen.

In addition, for example, when the track being played on the audio 21 is to be changed, if the rotation angle exceeds the first threshold, a start or a hook of the next track is played for a predetermined period while the current track is being played to notify the user of the control content corresponding to the gesture of the user, thereby providing the user with a chance of feedback. As a result, the operability for the user increases, and unintended control of an apparatus by the user can be prevented.

The thresholds are set for the rotation angle, but a threshold may be set for the movement speed of the hand. For example, if the user rotates the hand while the movement speed is equal to or less than the threshold, the operation command generation part 15 may switch only one screen, and if the user rotates the hand while the movement speed is larger than the threshold, the operation command generation part 15 may switch two or more screens. In other words, the user can intuitively and easily operate the in-vehicle navigation devices group 2 by assigning similar but different functions depending on the movement speed.

It should be noted that the above-mentioned various embodiments can be combined. For example, an apparatus of the control target and a function of the apparatus may be identified by combining the motion of the hand according to the eighth embodiment with the shape of the hand and the direction of the hand according to the first embodiment.

It should be noted that this invention is not limited to the above-mentioned embodiments, and can include various modified examples. For example, the above-mentioned embodiments are detailed for the sake of easy understanding of this invention, and this invention is not limited to a case including all the described configurations. Moreover, a part of a configuration of a certain embodiment can be replaced by a configuration of another embodiment, and a configuration of a certain embodiment can be added to a configuration of another embodiment. Moreover, a part of the configuration of each of the embodiments can be added with, deleted, or replaced by another component.

Moreover, the respective configurations, functions, processing parts, processing means, and the like in part or entirety may be realized as hardware by designing integrated circuits. Moreover, the respective configurations, functions, and the like may be realized as software by a processor interpreting and executing programs realizing the respective functions. Programs, tables, files, and the like for realizing the respective functions may be stored in a recording apparatus such as a memory, a hard disk, and a solid state drive (SSD), or a recording medium such as an IC card, an SD card, and a DVD.

What is claimed is:

1. A control apparatus to be connected to at least one of a route guidance apparatus and a plurality of other apparatuses, comprising:
    a processor; and
    a memory storing instructions executable by the processor, the instructions programming the processor to execute:
        a hand detection part for detecting an area of a hand of a user from acquired image data;
        a shape recognition part for recognizing a shape of the hand based on the detected area of the hand;
        a direction recognition part for recognizing a direction that the hand indicates from a median point of the hand to a fingertip of the hand based on the detected area of the hand;
        a motion recognition part for recognizing a direction of motion of the hand and an amount of motion of the hand based on the area of the hand and the direction that the hand indicates; and
        an operation command generation part for outputting a control command to at least one of the route guidance apparatus and the other apparatuses connected to the route guidance apparatus,
    wherein, when the amount of motion of the hand is less than a predetermined threshold and when the direction that the hand indicates and the direction of motion of the hand are in a same direction, the operation command generation part outputs the control command based on the shape of the hand, the direction that the hand indicates, the direction of motion of the hand, and the amount of motion of the hand,
    wherein, when the amount of motion of the hand is less than the predetermined threshold, the operation command generation part outputs the control command based on the shape of the hand, the direction that the hand indicates, the direction of motion of the hand, and the amount of motion of the hand from a predetermined period before the amount of motion of the hand is less than the predetermined threshold, and
    wherein, when the amount of motion of the hand is equal to or more than the predetermined threshold, the operation command generation part does not output the control command.

2. The control apparatus according to claim 1, wherein:
    the memory further stores:
        apparatus relationship information indicating a correspondence relationship between shapes of the hand recognizable by the shape recognition part and ones of the route guidance apparatus and the other apparatuses to be selected as a control target, and
        function relationship information indicating a correspondence relationship between the shape of the hand, the direction that the hand indicates, the direction of motion of the hand, and the amount of motion of the hand and functions to be controlled,
    wherein the operation command generation part is further configured to:

refer to the apparatus relationship information, and select one of the apparatuses corresponding to the shape recognized by the shape recognition part as the control target; and refer to the function relationship information, identify one of the functions corresponding to the shape of the hand, the direction that the hand indicates, the direction of motion of the hand, and the amount of motion of the hand, and output the control command.

3. The control apparatus according to claim 1, wherein the instructions further programming the processor to:

detect a face area of the user from the acquired image data;

set an area for detecting the hand of the user based on a position of the face area in the acquired image data; and exclude an area where the hand of the user is placed during a period other than an operation period for controlling at least one of the route guidance apparatus and the plurality of other apparatuses from the area for detecting the hand.

4. The control apparatus according to claim 1, further comprising:

an illumination apparatus disposed to illuminate an area where the hand of the user is placed.

5. A vehicle, comprising:

the control apparatus according to claim 1;

a route guidance apparatus; and an imaging apparatus, wherein the imaging apparatus is disposed below a center of an in-vehicle steering wheel, and arranged so that a ceiling inside the vehicle serves as a background of the hand of the user.

6. A portable terminal connectable to at least one of a route guidance apparatus and a plurality of other apparatuses via a control apparatus to output a control command to at least one of the route guidance apparatus and the plurality of other apparatuses, the portable terminal comprising:

an imaging apparatus;

a processor; and a memory storing instructions executable by the processor, the instructions programming the processor to execute:

a hand detection part for detecting an area of a hand of a user from acquired image data from the imaging apparatus;

a shape recognition part for recognizing a shape of the hand based on the detected area of the hand;

a direction recognition part for recognizing a direction that the hand indicates from a median point of the hand to a fingertip of the hand based on the detected area of the hand;

a motion recognition part for recognizing a direction of motion of the hand and an amount of motion of the hand based on the area of the hand and the direction that the hand indicates, and outputting the shape of the hand, the direction that the hand indicates, the direction of the motion of the hand, and the amount of motion of the hand to the control apparatus, wherein the control apparatus is configured to output the control command to at least one of the route guidance apparatus and the plurality of other apparatuses, wherein, when the amount of motion of the hand is less than a predetermined threshold and when the direction that the hand indicates and the direction of motion of the hand are in a same direction, the motion recognition part outputs the shape of the hand, the direction that the hand indicates, the direction of the motion of the hand, and the amount of motion of the hand to the control apparatus and the control apparatus outputs the control command based thereon, wherein, when the amount of motion of the hand is less than the predetermined threshold, the motion recognition part outputs the shape of the hand, the direction that the hand indicates, the direction of the motion of the hand, and the amount of motion of the hand to the control apparatus from a predetermined period before the amount of motion of the hand is less than the predetermined threshold to the control apparatus, and wherein, when the amount of motion of the hand is equal to or more than the predetermined threshold, the motion recognition part does not output the shape of the hand, the direction that the hand indicates, the direction of the motion of the hand, and the amount of motion of the hand to the control apparatus and the control apparatus does not output the control command.

* * * * *